(12) United States Patent
Davis

(10) Patent No.: US 11,629,789 B1
(45) Date of Patent: Apr. 18, 2023

(54) VALVE ASSEMBLY

(71) Applicant: Brian Lee Davis, Ripon, WI (US)

(72) Inventor: Brian Lee Davis, Ripon, WI (US)

(*) Notice: Subject to any disclaimer, the term of this patent is extended or adjusted under 35 U.S.C. 154(b) by 118 days.

(21) Appl. No.: 17/003,720

(22) Filed: Aug. 26, 2020

Related U.S. Application Data

(60) Provisional application No. 62/892,127, filed on Aug. 27, 2019.

(51) Int. Cl.
| | |
|---|---|
| *F16K 5/12* | (2006.01) |
| *F16K 31/04* | (2006.01) |
| *F01B 17/04* | (2006.01) |
| *F01B 3/00* | (2006.01) |
| *F01B 25/10* | (2006.01) |
| *F16K 5/18* | (2006.01) |

(Continued)

(52) U.S. Cl.
CPC .............. *F16K 5/12* (2013.01); *F01B 3/0055* (2013.01); *F01B 3/0058* (2013.01); *F01B 3/0064* (2013.01); *F01B 3/0091* (2013.01); *F01B 17/04* (2013.01); *F01B 25/10* (2013.01); *F16K 3/246* (2013.01); *F16K 3/267* (2013.01); *F16K 5/181* (2013.01); *F16K 31/046* (2013.01); *F01B 2250/001* (2013.01); *F16K 5/0471* (2013.01); *F16K 5/103* (2013.01)

(58) Field of Classification Search
CPC ..... Y10T 137/87121; Y10T 137/87129; Y10T 137/87137; F16K 3/246; F16K 3/267; F16K 5/10; F16K 5/103; F16K 5/0407; F16K 5/0471; F16K 27/065; F16K 31/04; F16K 31/041; F16K 3/043; F01B 3/005; F01B 3/0055; F01B 3/0058; F01B 3/0064; F01B 3/0091; F01B 17/04; F01B 25/10; F01B 2250/001

USPC ........... 251/129.11, 188, 215, 218, 229, 266, 251/268, 309, 314–317, 324, 325

See application file for complete search history.

(56) References Cited

U.S. PATENT DOCUMENTS

| | | | | |
|---|---|---|---|---|
| 494,569 A | * | 4/1893 | Howell | F16K 5/166 |
| | | | | 251/188 |
| 2,072,965 A | * | 3/1937 | Robinson | F16K 5/184 |
| | | | | 251/188 |

(Continued)

OTHER PUBLICATIONS

Travis L. Brown, Prasad Atluri and James P. Schmiedeler, Design of High Speed Rotary Valves for Pneumatic Applications (Abstract Only), from J. Mech. Des 136(1) as viewed at asme.org (specific web address for reference unknown) on Feb. 10, 2019, 2 pages.

*Primary Examiner* — Matthew W Jellett
(74) *Attorney, Agent, or Firm* — Brannen Law Office, LLC

(57) ABSTRACT

A valve assembly is adjustable in three independent ways allowing it to provide a variable input volume. The valve assembly has a base and an entrance plate. An outer guide, an inner guide and a shaft, each with a passage, are held together and the shaft is rotatable between the guides. The valve is open when the passages of the inner guide plate and shaft are aligned and closed when the passages are not aligned. The shaft RPM determines how many times per minute the valve opens. The open/closed ratio of the valve assembly determines how long the valve is open during each half revolution. The location of the shaft up or down in relationship to the inner guide determines what percentage of possible flow passes through the valve during each half revolution. The valve assembly can be used with either a gas or liquid medium.

19 Claims, 34 Drawing Sheets

(51) Int. Cl.
*F16K 3/24* (2006.01)
*F16K 3/26* (2006.01)
*F16K 5/04* (2006.01)
*F16K 5/10* (2006.01)

(56) References Cited

U.S. PATENT DOCUMENTS

| | | | | |
|---|---|---|---|---|
| 2,127,351 A | * | 8/1938 | Davis | F16F 1/24 |
| | | | | 267/53 |
| 2,196,219 A | | 4/1940 | Madden | |
| 2,341,411 A | * | 2/1944 | Ojalvo | F16K 5/10 |
| | | | | 251/266 |
| 2,371,657 A | * | 3/1945 | Stark | F16K 11/085 |
| | | | | 251/297 |
| 2,559,695 A | * | 7/1951 | Allen | F16K 5/0271 |
| | | | | 251/309 |
| 2,765,143 A | * | 10/1956 | Best | F16K 27/00 |
| | | | | 251/327 |
| 2,997,057 A | * | 8/1961 | Toth | F16K 5/0471 |
| | | | | 137/454.2 |
| 3,212,752 A | * | 10/1965 | Kast | F16K 5/0414 |
| | | | | 251/185 |
| 3,213,888 A | * | 10/1965 | Cameron | F15B 11/04 |
| | | | | 137/637.4 |
| 3,425,451 A | * | 2/1969 | Smith | F16K 5/10 |
| | | | | 137/637.4 |
| 3,504,885 A | * | 4/1970 | Hulsey | F16K 3/0227 |
| | | | | 251/328 |
| 3,763,890 A | * | 10/1973 | Wolf | F16K 3/32 |
| | | | | 137/454.6 |
| 4,150,692 A | * | 4/1979 | Wolf | F16K 3/32 |
| | | | | 251/208 |
| 4,410,003 A | | 10/1983 | Sanding | |
| 4,478,388 A | | 10/1984 | George | |
| 4,640,302 A | * | 2/1987 | Impey | F16K 3/0272 |
| | | | | 137/215 |
| 5,154,147 A | | 10/1992 | Muroki | |
| 5,878,707 A | | 3/1999 | Ballard | |
| 5,901,944 A | | 5/1999 | Ramakrishnan et al. | |
| 5,953,914 A | | 9/1999 | Frangipane | |
| 6,260,821 B1 | * | 7/2001 | Perry | F41B 11/724 |
| | | | | 251/309 |
| 6,554,249 B2 | * | 4/2003 | Pang | F16K 5/188 |
| | | | | 251/316 |
| 6,962,169 B2 | * | 11/2005 | Kaske | B08B 3/02 |
| | | | | 137/624.13 |
| 9,458,941 B2 | * | 10/2016 | Bohaychuk | F16H 31/001 |
| 9,874,283 B1 | * | 1/2018 | Shih | F16K 27/065 |
| 10,047,868 B2 | * | 8/2018 | Ertl | F16K 5/10 |
| 11,261,987 B2 | * | 3/2022 | Walker | F16K 27/08 |
| 2009/0217904 A1 | | 9/2009 | Lee et al. | |
| 2013/0153805 A1 | * | 6/2013 | Stulik | F16K 5/0207 |
| | | | | 251/304 |
| 2013/0334446 A1 | | 12/2013 | Gur | |
| 2017/0175907 A1 | | 6/2017 | Ertl | |

* cited by examiner

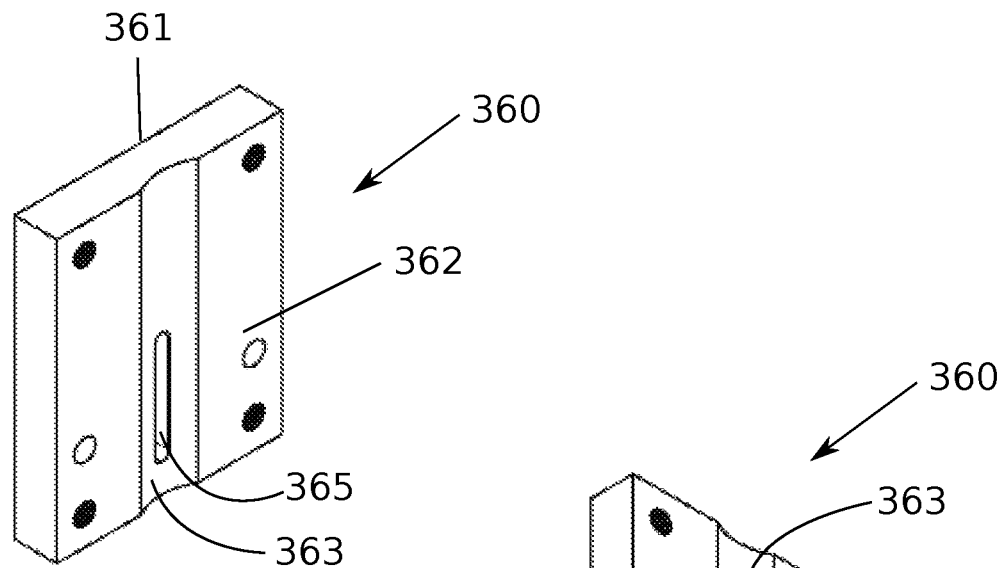
FIG. 18
FIG. 19
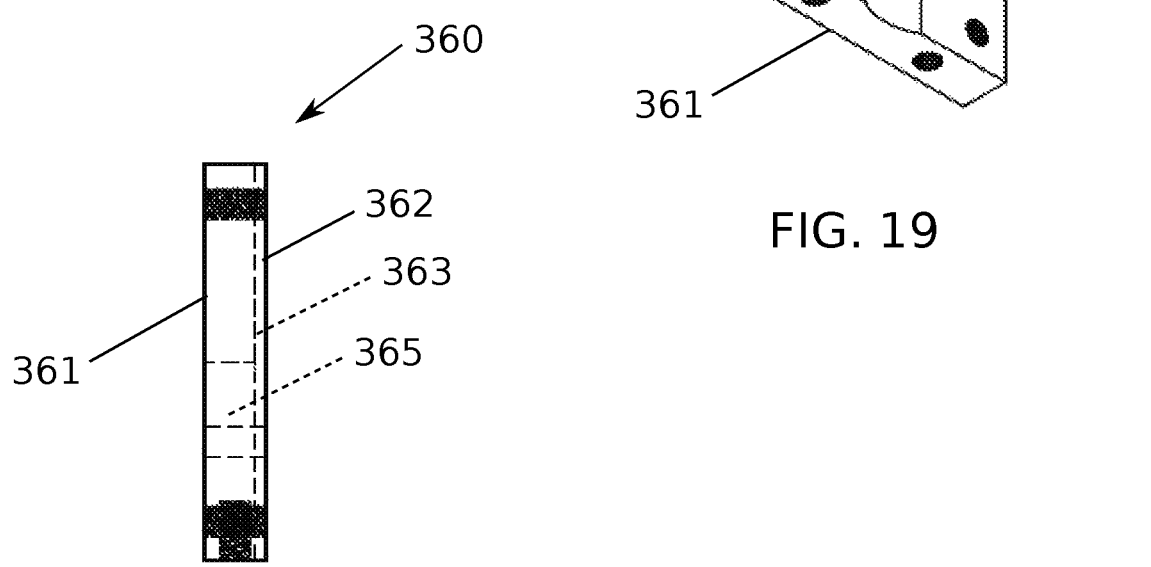
FIG. 20

FIG. 29
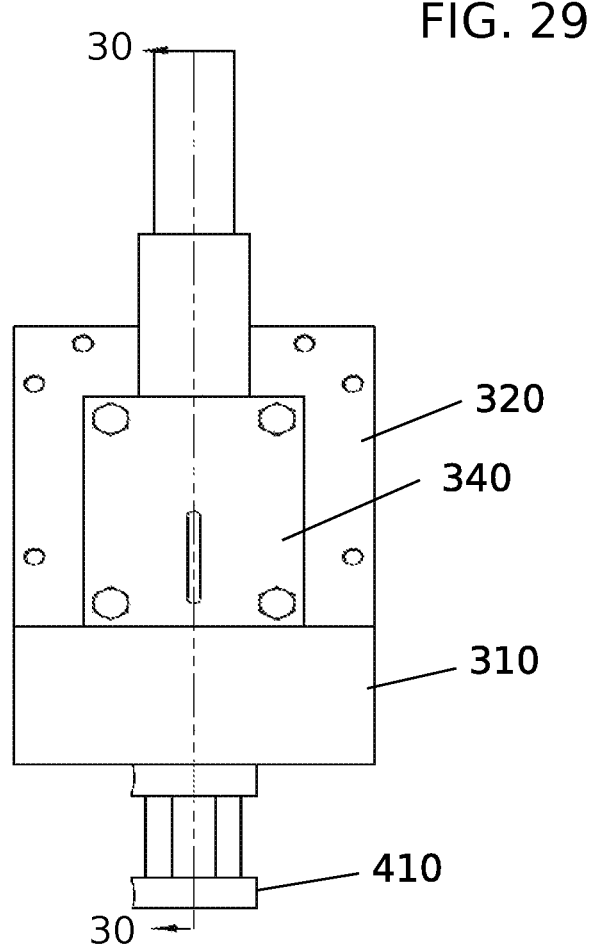
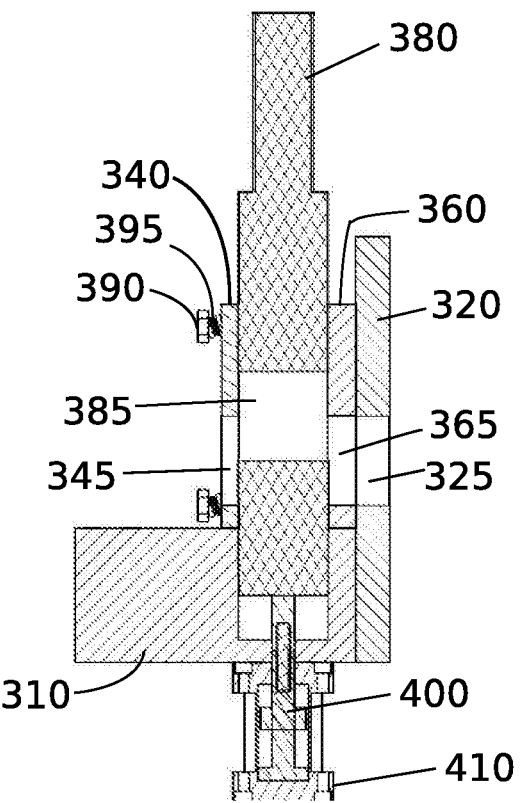
FIG. 30

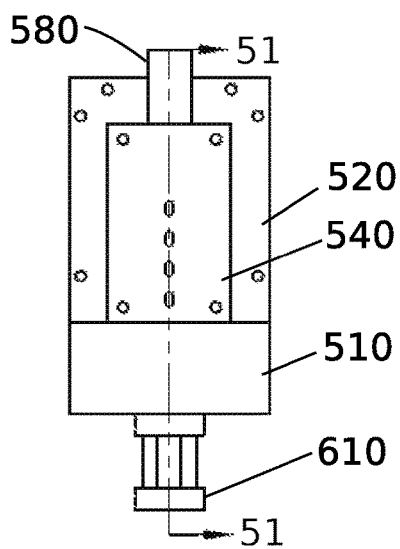
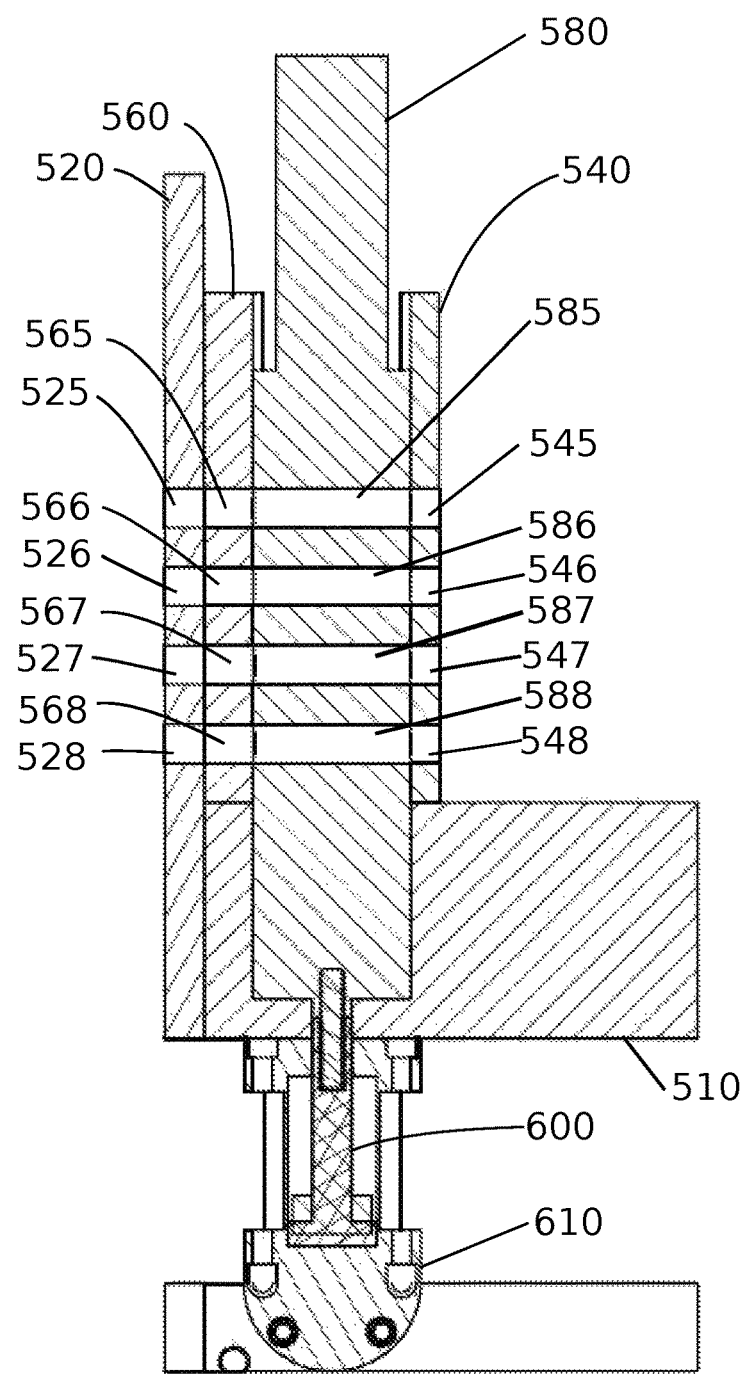
FIG. 50
FIG. 51

VALVE ASSEMBLY

This United States utility patent application claims priority on and the benefit of provisional application 62/892,127 filed Aug. 27, 2019, the entire contents of which are hereby incorporated herein by reference.

BACKGROUND OF THE INVENTION

1. Field of the Invention

The present invention relates to a valve assembly and in particular to a valve assembly that can be adjusted in three independent ways to efficiently operate with an expansion chamber of a fixed volume.

2. Description of the Related Art

With any high-pressure gas engine or pump, a valve needs to open and allow a small volume of high-pressure and high temperature gas or steam to enter the expansion cavity of the pump. The valve then needs to close, thereby stopping any more high-pressure gas from entering in order to achieve any type of efficiency. Further, the closing of the valve "seals the expansion cavity" so the high-pressure gas within the cavity can only move the movable piston, rotor or vane and cannot move the valve or other component rearward during its expansion.

When dealing with steam, the expansion ratio of high-pressure gas/low-pressure gas is high. It is desirable to have a minimum ratio of 20-25 in order to achieve any sort of thermodynamic efficiency at all. Due to these facts, the inlet valves need to operate very quickly. Revolutions per minute (RPMs) of the engine or pump play a large role in the speed requirement of the valve. Even with the rotary engine operating at a relatively slow RPM, around 250 RPM, the speed of the valve close to open and close needs to happen in around 20 milliseconds. Existing valves simply do not operate this quickly.

Further, most conventional valves have an upper operating limit of around 250-300 F. Thus, the conventional valves are not suitable for use above the upper operating limit due to risk of degradation, malfunction, destruction, etc.

Still further, conventional valves operate at a set volume per second.

Thus, there exists a need for a valve assembly that solves these and other problems.

SUMMARY OF THE INVENTION

A valve assembly is provided which can be used with an expansion engine for example. The valve assembly can be adjusted in three independent ways allowing it to provide a variable input volume for a fixed volume expansion chamber. The valve assembly has a base and an entrance plate. An outer guide, an inner guide and a shaft, each with a passage, are held together and the shaft is rotatable between the inner and outer guides. The valve is open when the passages of the inner guide plate and shaft are aligned and closed when the passages are not aligned. The shaft RPM determines how many times per minute the valve opens. The open/closed ratio of the valve assembly determines how long the valve is open during each half revolution. The location of the shaft up or down in relationship to the inner guide determines what percentage of possible flow passes through the valve during each half revolution.

According to one advantage of the present invention, the user can independently manipulate one or more of three variables (RPM, orifice size and open/close ratio) to operate an expansion motor with a variable input with an expansion chamber with a fixed volume. For example, the present invention allows a user to vary the volume/second and also the amount of times the valve assembly opens per second.

According to a further advantage of the present invention, the use of a rotating shaft results in a very fast opening and closing of the valve assembly. The valve assembly is open when the passage through the shaft is aligned with the passage through the inner guide.

According to a still further advantage of the present invention, the inner and outer guides have a recess on their respective inner face. The recesses cradle the shaft. In one embodiment, the bearing surface could be bronzed (or otherwise modified) for enhanced wear and lubrication qualities.

According to a still further advantage yet of the present invention, the inner and outer guides only contact the shaft at the recesses. In this regard, the shaft is not fully surrounded by the inner and outer guides. This advantageously enhances heat dissipation. Also, since steam (or another high-pressure gas) surrounds the shaft (except where the shaft is cradled by the inner and outer guides), the steam provides constant lubrication to the shaft.

According to a still further advantage yet of the present invention, the shaft passage is subject to the same pressure when the valve assembly is closed as when it is open. This advantageously avoids vacuums which would interfere with smooth valve assembly operation.

According to a still further advantage yet of the present invention, springs are used with connectors that connect the inner and outer guides and hold in contact with the shaft. The pressure provided by the springs allows for spring force to be applied to the guides such that a proper seal is made between the inner guide and the shaft, yet undo friction is prevented. This advantage is maintained even when the valve assembly components undergo thermal expansion and contraction.

According to a still further advantage yet of the present invention, the effective orifice or passage size can be altered by having the shaft undergo a linear shift relative to the inner and outer guides. This can be accomplished in one embodiment without altering the ratio or open/closed valve during each half revolution. This can be accomplished in another embodiment wherein the ratio of open/closed valve during each half revolution is altered. Because the size of the expansion chamber is fixed, varying the orifice size is advantageous so that an optimal amount of gas can enter the chamber each cycle.

According to a still further advantage yet of the present invention, the drive motor can have a female end with a cavity that linearly movably receives an end of the shaft (polygon shape in one embodiment). The drive motor accordingly can rotate the shaft regardless of the linear position of the shaft relative to the inner and outer guides.

According to a still further advantage yet of the present invention, the RPM, orifice size and open/close ratio can be selected wherein a 26:1 expansion ratio is used. In one embodiment, 1.5 cubic inch of steam can enter the expansion chamber during each pass (half revolution).

According to an advantage of an alternative embodiment of the present invention, there can be multiple linearly aligned passages through the inner guide and the shaft. In this regard minimal linear travel is necessary in order to adjust the effective orifice sizes as much less travel is needed to close multiple orifices a given percentage versus closing a single orifice the same percentage. This advantageously can result in a valve assembly with a more compact design.

According to a still further advantage yet of an embodiment of the present invention, a gate can be provided to limit the effective orifice size. The gate can advantageously be used in embodiments where the open/closed valve ratio is increased to limit the amount of gas entering the expansion chamber even though the length of time the valve is open is increased. This adjustment is useful independent of RPM.

According to a still further advantage yet of the present invention, the valve assembly is made of components not affected by heat at expected operating temperatures of about 250 degrees Celsius.

According to a still further advantage yet of the present invention, the valve assembly is rotatable about an axis resulting in closed position that is very stable (cannot be forced open).

According to a still further advantage yet of the present invention, the orifice size can be increased or decreased to accommodate different RPMs thereby delivering a constant volume per open and close cycle.

According to a still further advantage yet of the present invention, the valve assembly can be used with high-pressure liquids in addition to high-pressure gasses.

Other advantages, benefits, and features of the present invention will become apparent to those skilled in the art upon reading the detailed description of the invention and studying the drawings.

BRIEF DESCRIPTION OF THE DRAWINGS

FIG. 18 is a perspective view of the inner guide of the embodiment of FIG. 1.

FIG. 19 is an alternative perspective view of the inner guide of the embodiment of FIG. 1.

FIG. 20 is a side view of the inner guide of the embodiment of FIG. 1.

FIG. 29 is an end view of the valve assembly in an intermediate flow position.

FIG. 30 is a cross-sectional view taken along line 30-30 in FIG. 29.

FIG. 50 is an end view of the valve assembly of FIG. 33 with the shaft in a full flow position.

FIG. 51 is a cross-sectional view taken along line 51-51 in FIG. 50.

DETAILED DESCRIPTION OF PREFERRED EMBODIMENTS

While the invention will be described in connection with one or more preferred embodiments, it will be understood that it is not intended to limit the invention to those embodiments. On the contrary, it is intended to cover all alternatives, modifications and equivalents as may be included within the spirit and scope of the invention as defined by the appended claims.

The present invention is a valve assembly 300 that can be used within an expansion engine 10. It is appreciated that the valve assembly 300 is not limited for use with an expansion engine but instead is illustrated with such by way of illustration. Further, it is understood that while one particular engine 10 is illustrated, that the invention is not limited for use with the illustrated engine 10. A brief description of the engine 10 may be helpful prior to discussing the valve assembly 300 of the present invention.

Figure 1:
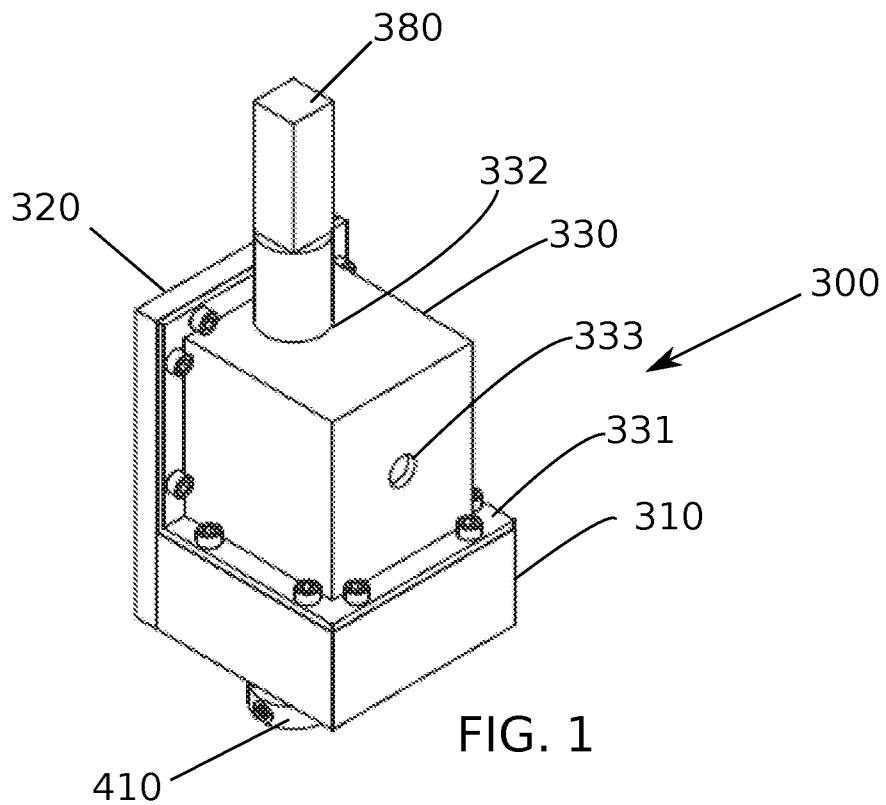
FIG. 1 is a perspective view of an embodiment of a valve assembly of the present invention.
Figure 2:
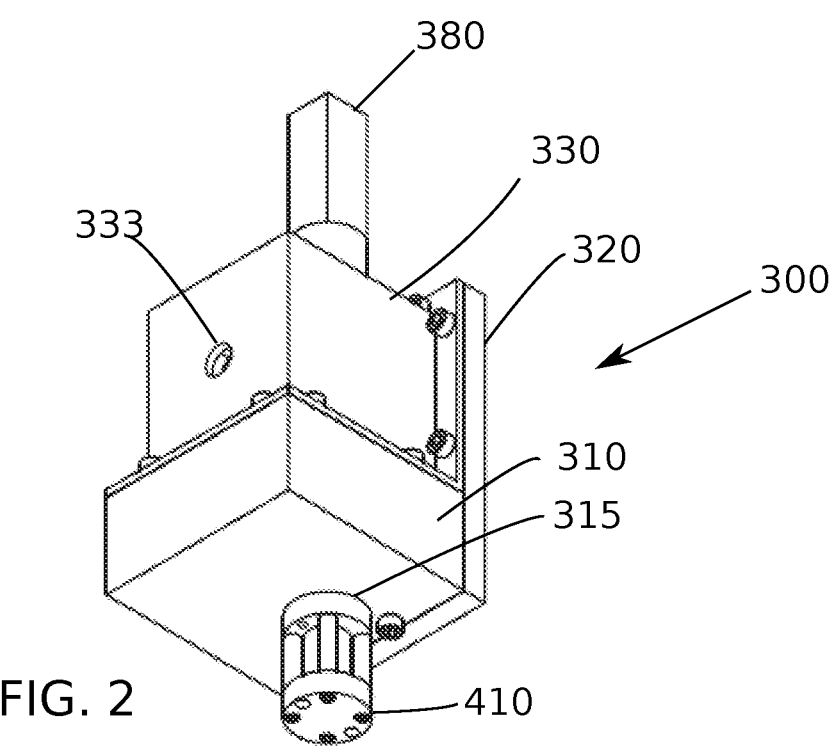
FIG. 2. is an alternative perspective view of the valve assembly illustrated in FIG. 1.
Figure 3:
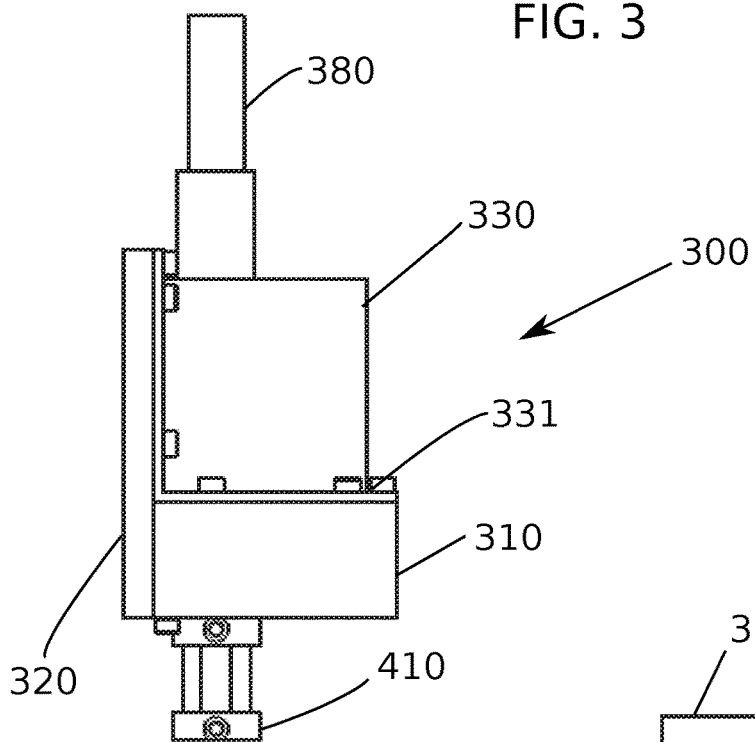
FIG. 3 is a side view of the valve assembly illustrated in FIG. 1.
Figure 4:
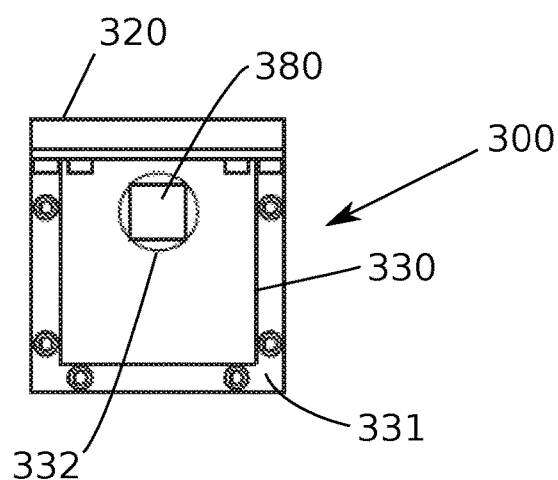
FIG. 4 is a top view of the valve assembly illustrated in FIG. 1.
Figure 5:
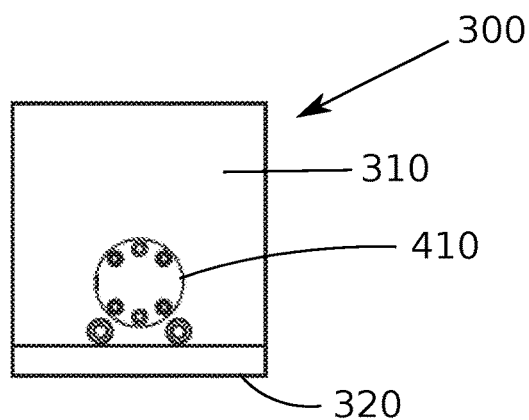
FIG. 5 is a bottom view of the valve assembly illustrated in FIG. 1.
Figure 6:
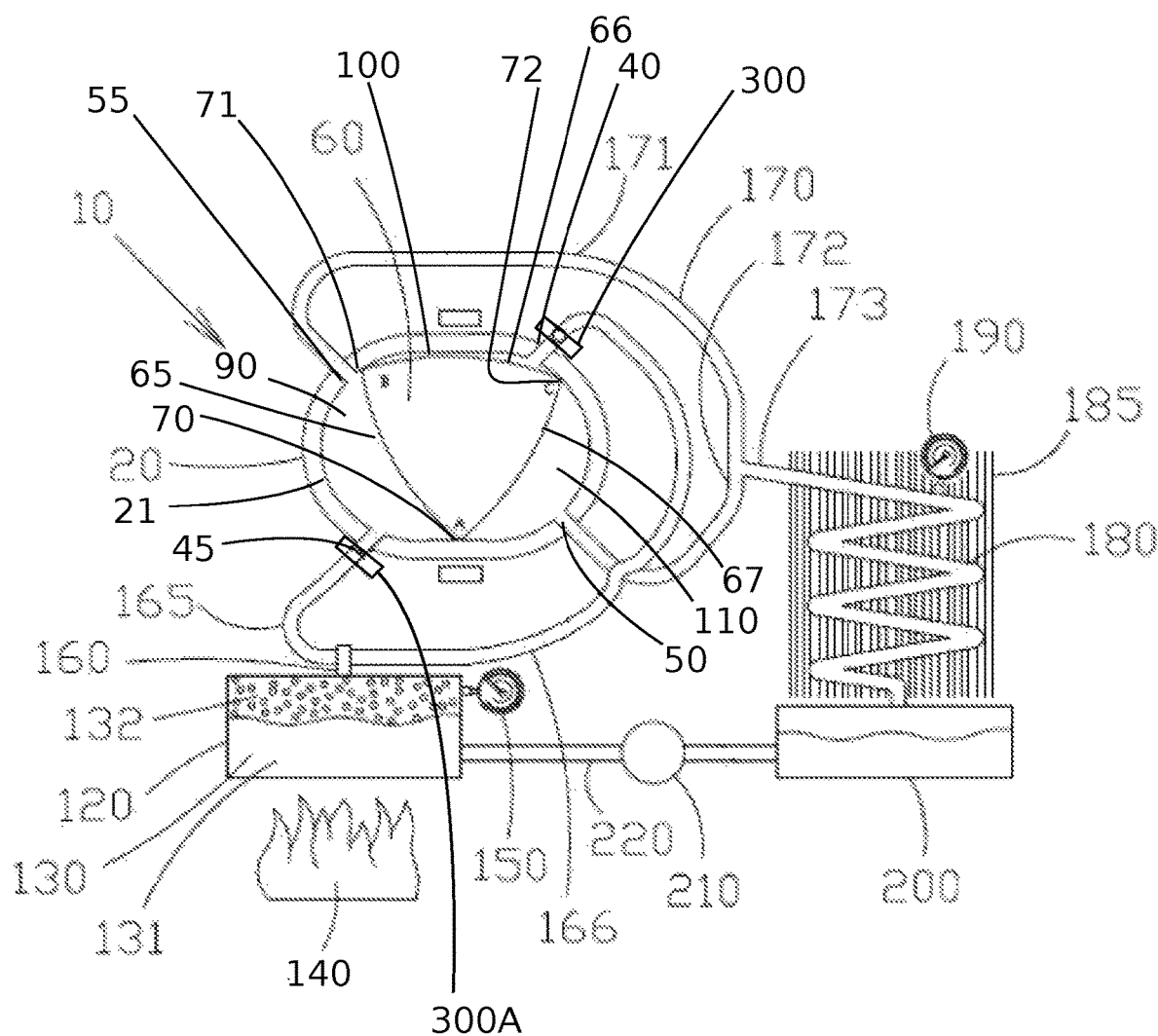
FIG. 6 is a schematic drawing showing the valve assembly in use within an engine.
Figure 7:
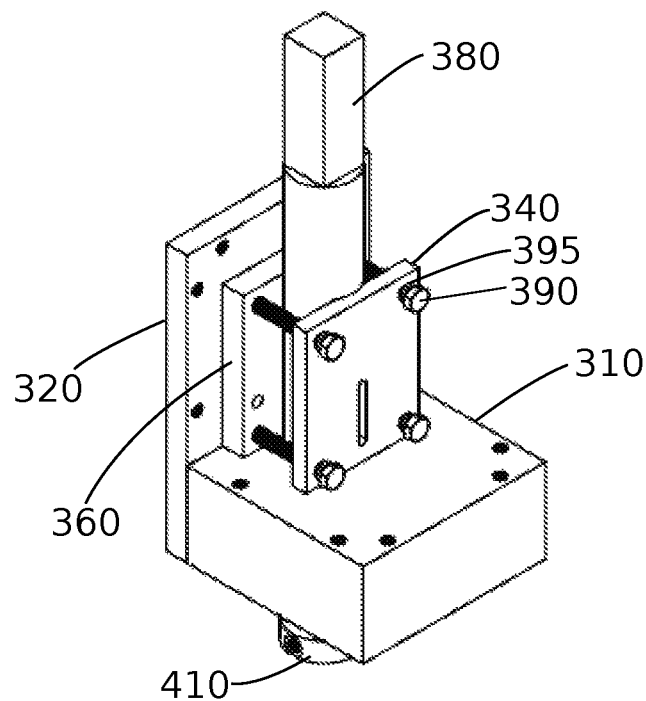
FIG. 7 is a perspective view of the embodiment of a valve assembly illustrated in FIG. 1 shown without a cover.
Figure 8:
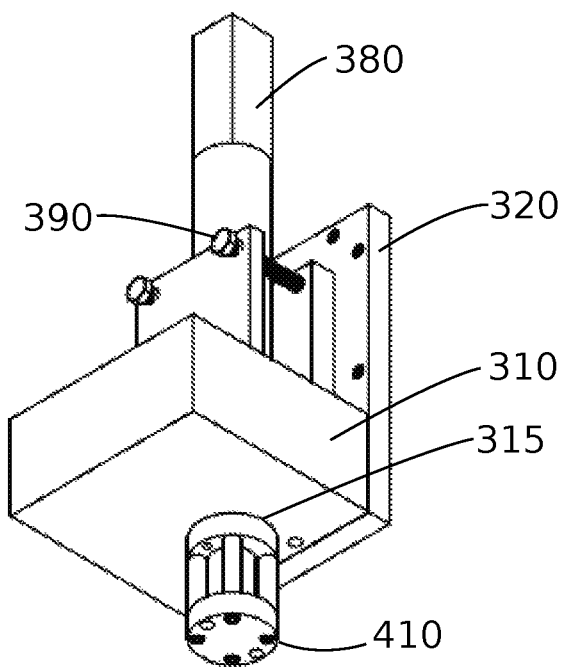
FIG. 8 is an alternative perspective view of the items shown in FIG. 7.
Figure 9:
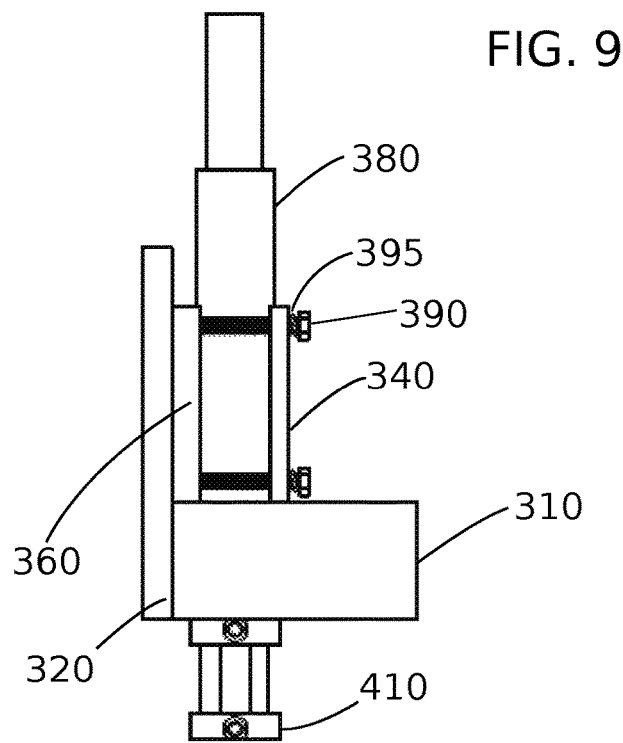
FIG. 9 is a side view of the items shown in FIG. 7 wherein the valve assembly is in the open position.
Figure 10:
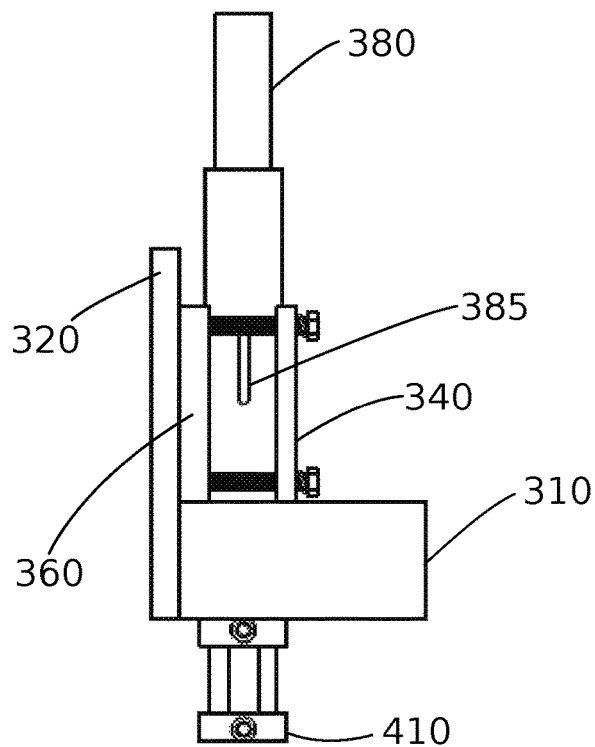
FIG. 10 is a side view of the items shown in FIG. 7 wherein the valve assembly is in the closed position.
Figure 11:
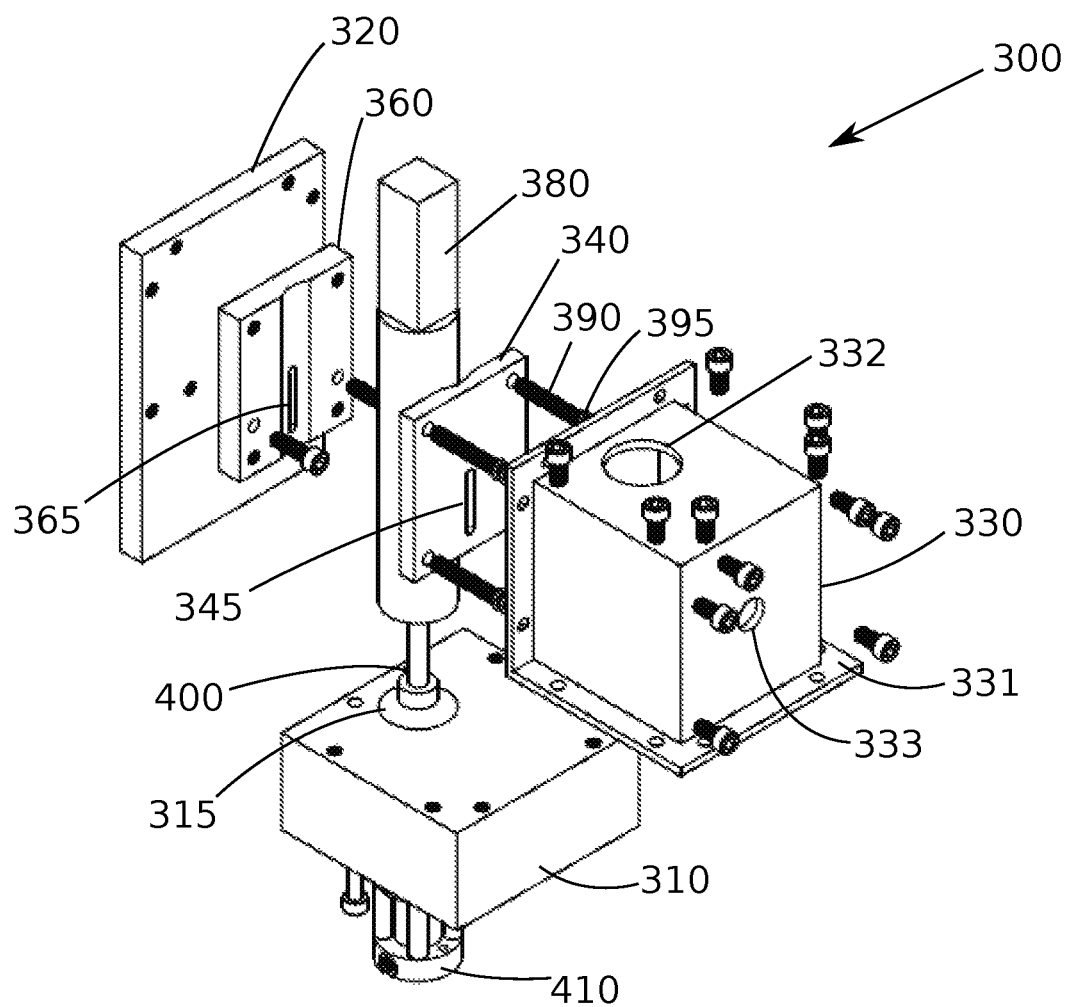
FIG. 11 is a perspective exploded view of the embodiment of the valve assembly illustrated in FIG. 1 with the valve assembly shown in the open position.
Figure 12:
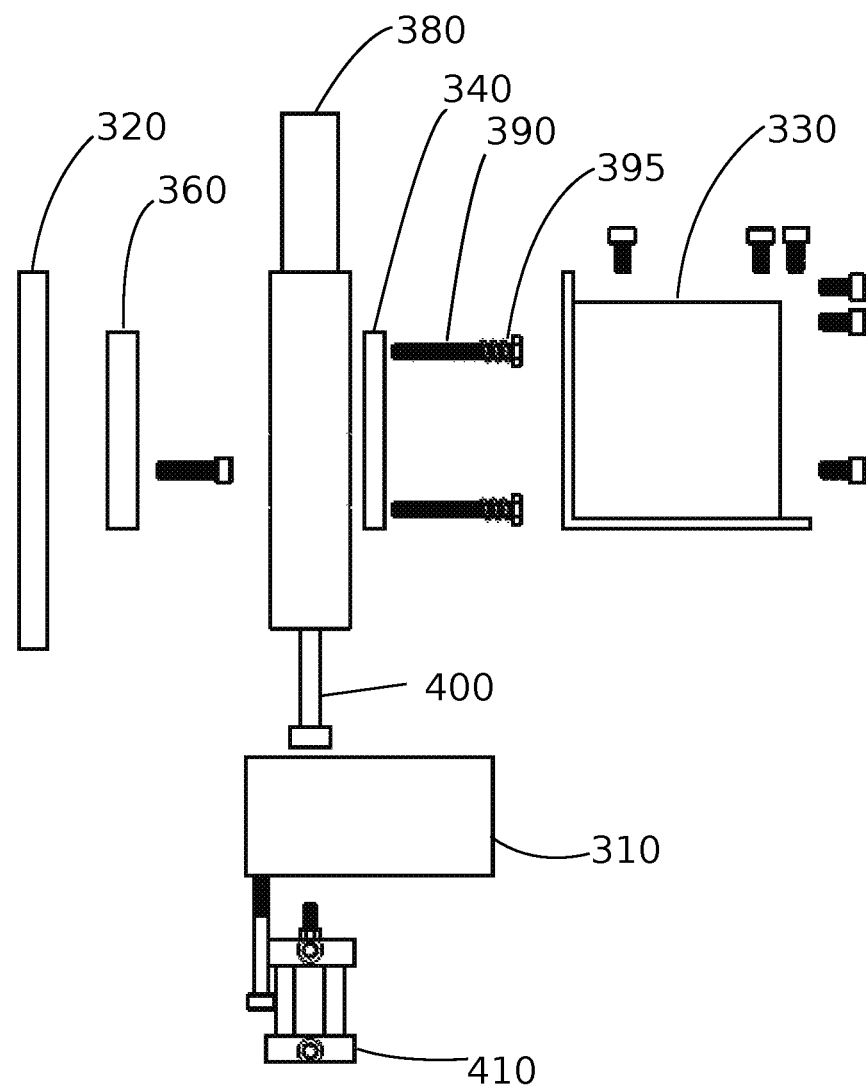
FIG. 12 is a side exploded view of the embodiment of the valve assembly illustrated in FIG. 1 with the valve assembly shown in the open position.
Figure 13:
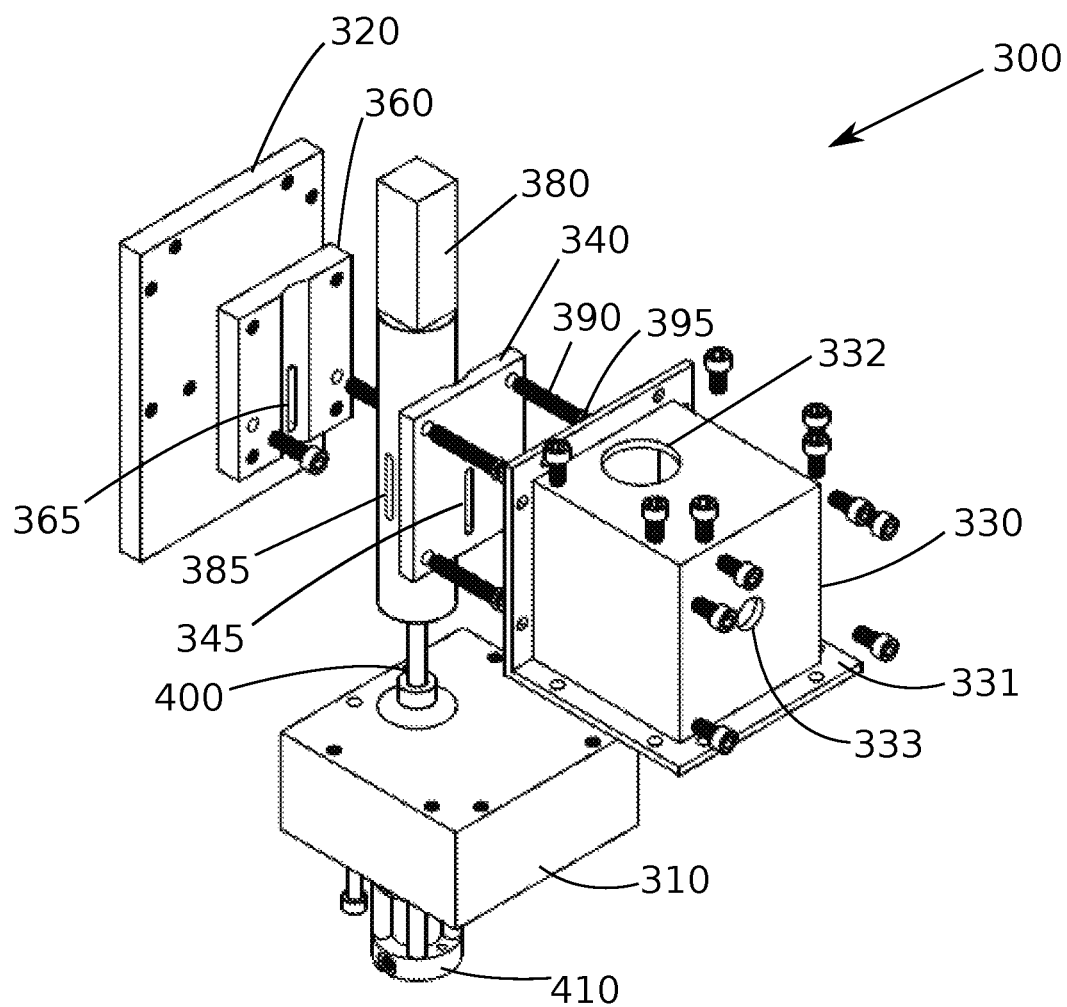
FIG. 13 is a perspective exploded view of the embodiment of the valve assembly illustrated in FIG. 1 with the valve assembly shown in the closed position.
Figure 14:
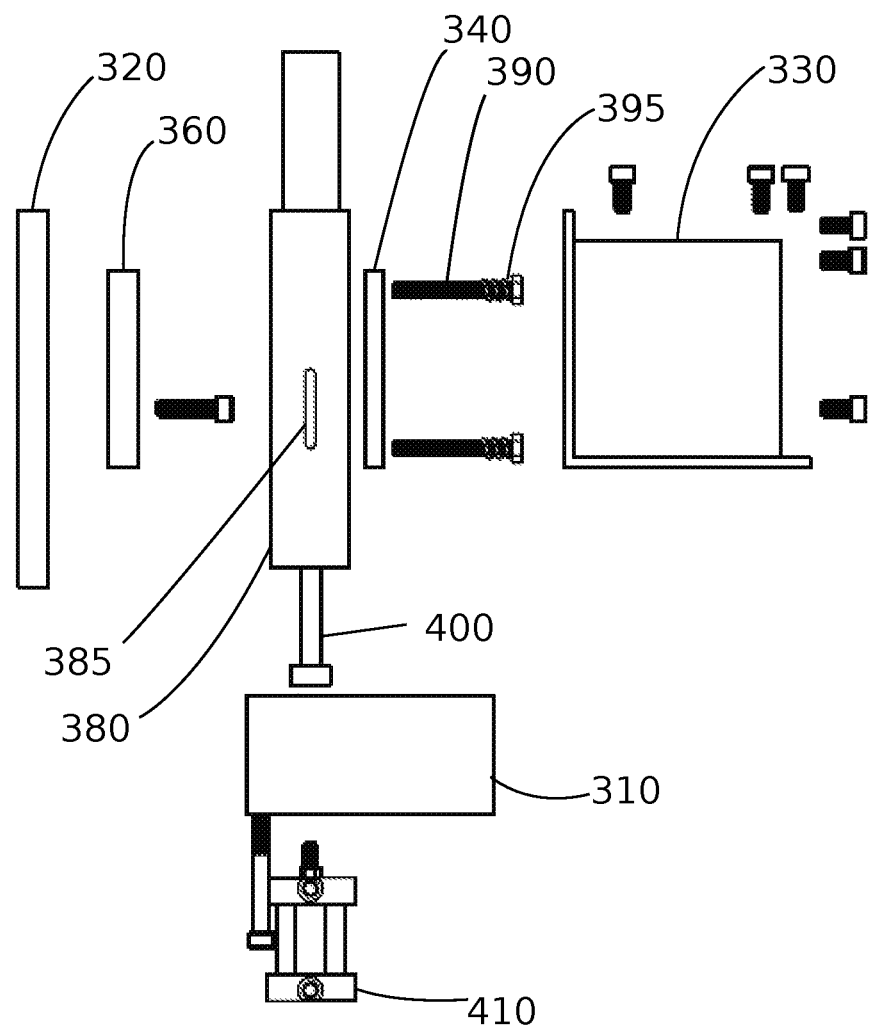
FIG. 14 is a side exploded view of the embodiment of the valve assembly illustrated in FIG. 1 with the valve assembly shown in the closed position.
Figure 15:
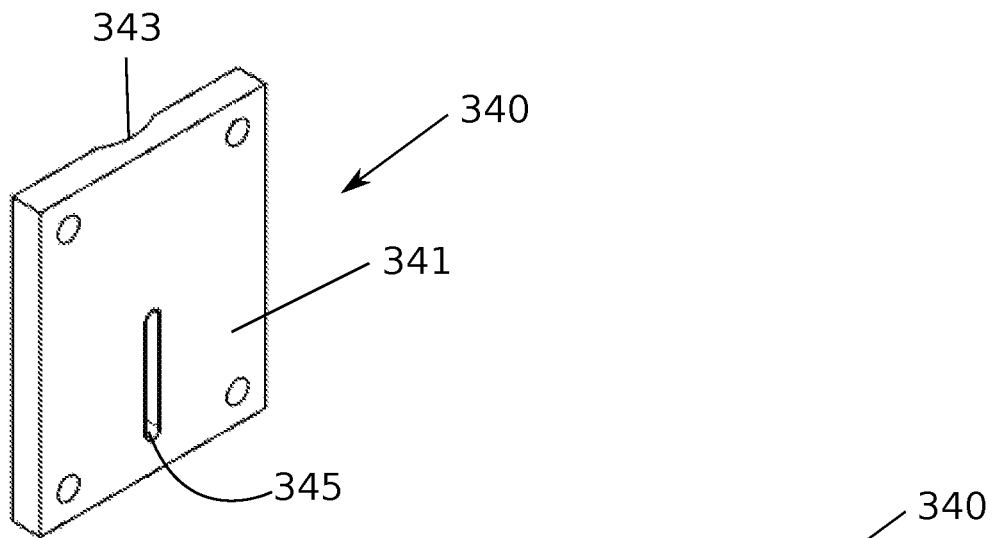
FIG. 15 is a perspective view of the outer guide of the embodiment of FIG. 1.
Figure 16:
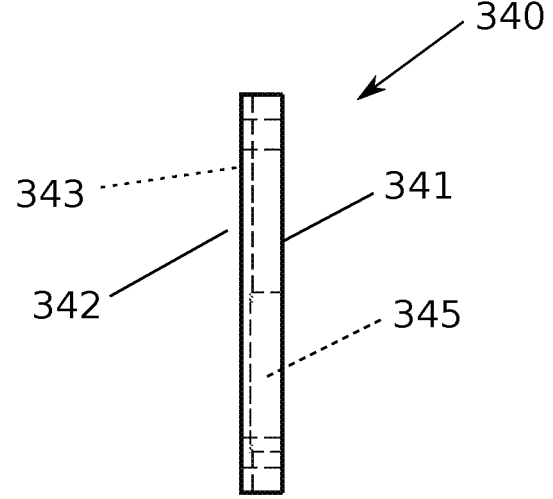
FIG. 16 is a side view of the outer guide of the embodiment of FIG. 1.
Figure 17:
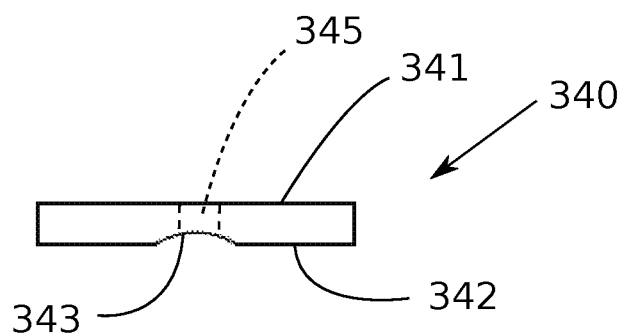
FIG. 17 is a top view of the outer guide of the embodiment of FIG. 1.
Figure 21:
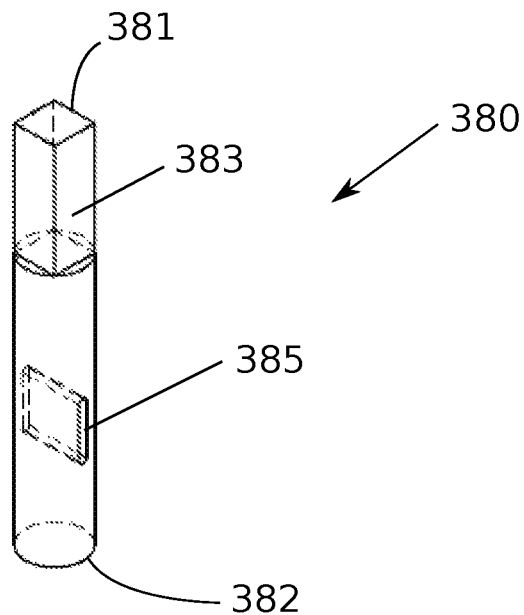
FIG. 21 is a perspective view of the shaft of the embodiment of FIG. 1.
Figure 22:
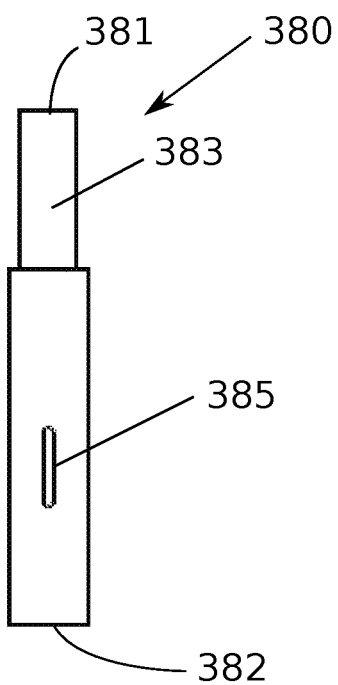
FIG. 22 is a side view of the shaft of the embodiment of FIG. 1.
Figure 23:
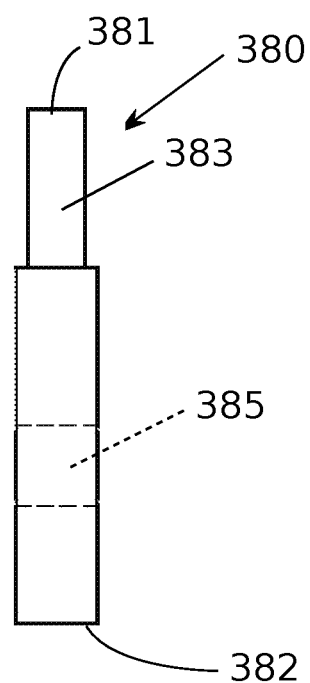
FIG. 23 is an alternative side view of the shaft of the embodiment of FIG. 1.

Looking first to FIG. 6, it is seen that an example of an engine 10 is provided having a housing 20. A rotor 60 is further provided. The rotor 60 rotates within the housing 20 as described below.

A high-pressure tank 120 is provided. The tank can be any suitable size. The tank 120 can hold a selected amount of working medium 130. The working medium is preferably a commonly available substance that undergoes a phase change between liquid 131 and gas 132 at predictable temperatures and pressures. One preferred substance is water. However, it is understood that other substances such as refrigerants could be used without departing from the broad aspects of the present invention.

A heat source 140 is provided. The heat source 140 is in close proximity to tank 120, whereby the heat source can heat the working medium 130 causing selected amounts of liquid 131 to undergo a phase change to gas 132 (for example, steam). The tank can hold the gas at high-pressures. It is understood that operating pressures and temperatures are determined based on system requirements and refrigerants used. A gauge 150 is provided for measuring the pressure in the high-pressure tank 120.

It is appreciated that while steam is a preferred gas when the valve is used in an expansion engine, that other gasses could be used without departing from the broad aspects of the present invention.

A high-pressure delivery system 160 is provided. The high-pressure delivery system 160 can be split into two lines, a first line 165 and a second line 166. The lines are fluidly connected wherein the pressure in each line 165 and 166 are preferably the same. The high-pressure delivery system 160 provides high-pressure gas to the housing 20 of the engine 10.

A low-pressure exhaust system 170 is further provided. The low-pressure exhaust system receives low-pressure exhaust from the housing 20 of the engine. The low-pressure exhaust system has a first line 171 and a second line 172. The first and second lines 171 and 172, respectively, combine in line 173.

The low-pressure exhaust 170 goes through a condensation chamber 180 having a heat exchanger 185. The condensation chamber 180 has a gauge 190 to measure pressure within the system on the low-pressure side of the system. The condensation chamber 180 empties liquid condensate into a low-pressure condensation tank 200. From there, a pump 210 is used to route liquid 131 back into the high-pressure tank 120 through a return line 220 to repeat the cycle.

The housing 20 has a wall with an inside surface 21. The inside surface defines a general epitrochoid shaped structure having a first section and a second section. The sections are generally open to each other but have a first radius and second radius there between. The radii protrude a small amount toward the center of the housing 20. The radii have openings or recesses to accommodate stationary gates. The openings preferably span from the top to the bottom or the full dimension of the housing and are complimentary in shape to the respective gates. It is appreciated that the openings or recesses may not span the full dimension so long as they support gates that do span the entire dimension.

The housing has an inlet 40 with a valve 300, an inlet 45 with a valve 300A, an outlet 50 and an outlet 55. The inlets 40 and 45 are spaced apart (preferably approximately 180 degrees on separate sides of the housing) and are separated by outlets 50 and 55. The valves 300 and 300A are preferably selectably opened and closed, and otherwise manipulated, under the direction of the processor.

The rotor 60 is generally reuleaux shaped. In this regard, the rotor 60 has three faces, namely a first face 65, a second face 66 and a third face 67. The faces meet at apexes, namely the apex A 70, apex B 71 and apex C 72. Seals are provided at apex A 70, apex B 71 and apex C 72. The faces travel closely to the inside surface 21 of the housing.

It is understood that the seals actually contact the housing, but for sake of simplicity in description, it is described herein as apex's passing certain points such as inlets and exhausts.

The housing 20 has a center or fulcrum. The rotor has a center line as well. The rotor center line is offset from the fulcrum a selected amount as the rotor 60 rotates in an eccentric manner about the housing 20.

A first expansion chamber 90, a second expansion chamber 100 and a third expansion chamber 110 are provided. The expansion chambers are located between the rotor 60 and the housing 20. A driving force is provided in an expansion chamber due to the offset orientation of the fulcrum and the rotor center.

It is understood, that one of the expansion chambers may be exposed to either the first inlet and first outlet or the second inlet and second outlet simultaneously. However, since the first inlet and second inlet both are valved (and can be closed) blow-by is prevented in the present invention as the respective valves will be closed when the condition exists that both the inlet and the outlet valves are exposed.

It is appreciated that in an engine with a single inlet and a single outlet, that only one valve assembly 300 is used.

Looking now to FIGS. 1-32, it is seen that a preferred embodiment of the valve assembly 300 is illustrated. Valve assembly 300A is illustrated in FIG. 6. Valve assembly 300A is the same as valve assembly 300. In this regard, no detailed description of valve assembly 300A will be provided.

The valve assembly 300 has a base 310, and entrance plate 320, a cover 330, an outer guide 340, an inner guide 360, a shaft 380, connectors 390, a positioner 410 and a drive motor 420. Each of these parts will be described below.

The base 310 is best illustrated in FIGS. 1-5, 7-14 and 24-32. Base 310 can have a hole 315 therethrough.

The entrance plate 320 is also best illustrate in FIGS. 1-5, 7-14 and 24-32. The entrance plate 320 has a passage 325 therethrough. One preferred passage profile is a slot with a generally constant width (the ends may be rounded). However, it is understood that other profiles could be used without departing from the broad aspects of the present invention. The entrance plate 320 generally lies in a plane that is perpendicular to the base plate 310.

Cover 330 is best seen in FIGS. 1-5 and 11-14. The cover 330 has a rail 331, a hole 332 and a gas inlet 333. The rail 331 has several holes therethrough for receiving screws to fasten the cover 330 to both the base plate 310 and the entrance plate 320. The shaft 380 extends through hole 332. Gas such as steam can be introduced through inlet 333. The gas fills the cavity defined by the cover 330, base plate 310 and entrance plate 320.

The outer guide 340 is best seen in FIGS. 7-14, 15-17, 24-26, 28, 30 and 32. The outer guide 340 has a top, a bottom and two sides. The outer guide has an outer face 341 and an inner face 342. The inner face 342 has a recess 343 that preferably spans all the way between the top and bottom of the guide 340. A passage 345 passes between the outer face 341 and the inner face 342. The passage 345 is preferably centrally located within the recess 343. One preferred passage profile is a slot with a generally constant width (the ends may be rounded). However, it is understood that other profiles could be used without departing from the broad aspects of the present invention.

The inner guide 360 is best seen in FIGS. 7-14, 15-17, 24-26, 28, 30 and 32. The inner guide 360 has a top, a bottom and two sides. The inner guide has an outer face 361 and an inner face 362. The inner face 362 has a recess 363 that preferably spans all the way between the top and bottom of the guide 360. A passage 365 passes between the outer face 361 and the inner face 362. The passage 365 is preferably centrally located within the recess 363. One preferred passage profile is a slot with a generally constant width (the ends may be rounded). However, it is understood that other profiles could be used without departing from the broad aspects of the present invention.

The shaft 380 is best illustrated in FIGS. 7-14, 21-26, 28, 30 and 32. The shaft is preferably a linear and round shaft having a first end 381 and a second end 382. The first end 381 can have a shape, which can be polygon 383. A passage 385 is through the shaft 380 between the first and second ends, 381 and 382, respectively. One preferred passage 385 is a slot with a generally constant width (the ends may be rounded). However, it is understood that other profiles could be used without departing from the broad aspects of the present invention.

Connectors 390 and springs 395 are used to hold the shaft 380 between the outer guide 340 and the inner guide 360. The connectors 390 pass through connector holes in the inner and outer guides. In this regard, the shaft 380 is cradled within the recess 343 of the outer guide 340 and cradled within the recess 363 of the inner guide 360. The springs 395 are between the connector head and the outside face 341 of the outer guide 340. In this regard, the springs 395 provide a spring force to hold the outer guide in contact with the shaft 380 to accommodate thermal expansion during operation.

A piston rod 400 is provided as seen in FIGS. 11-14. The piston rod 400 connects the shaft 380 with a positioner 410. The positioner 410 is shown in FIGS. 1-3, 5, 7-14 and 24-32. The positioner 410 is located below the base 310 and the piston rod 400 extends through hole 315 to linearly adjust the location of the shaft 380 relative to the outer guide 340 and inner guide 360.

Figure 24:
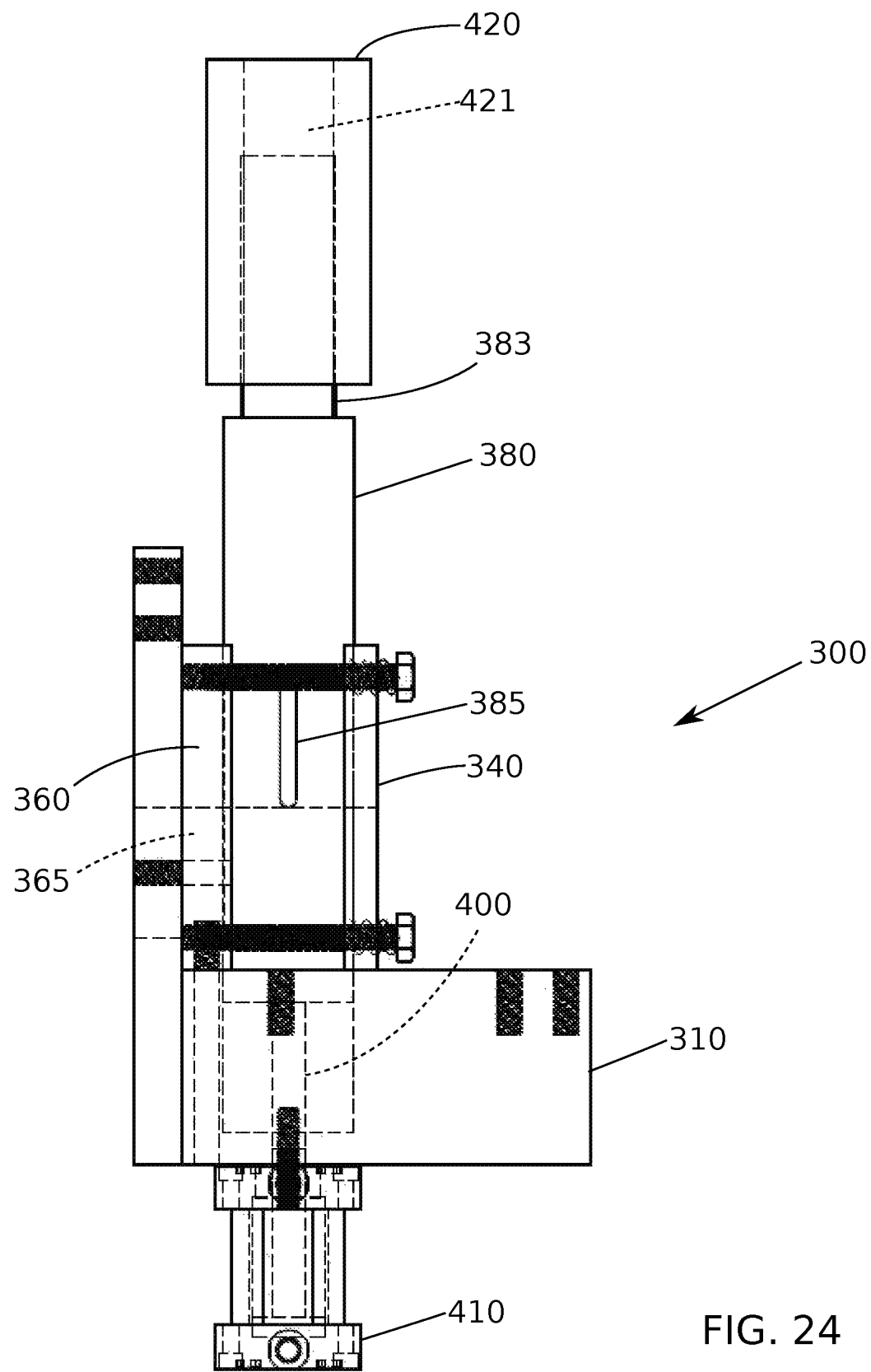
FIG. 24 is a side view showing the shaft located in a position wherein the valve assembly has no available flow per half revolution when open.
Figure 25:
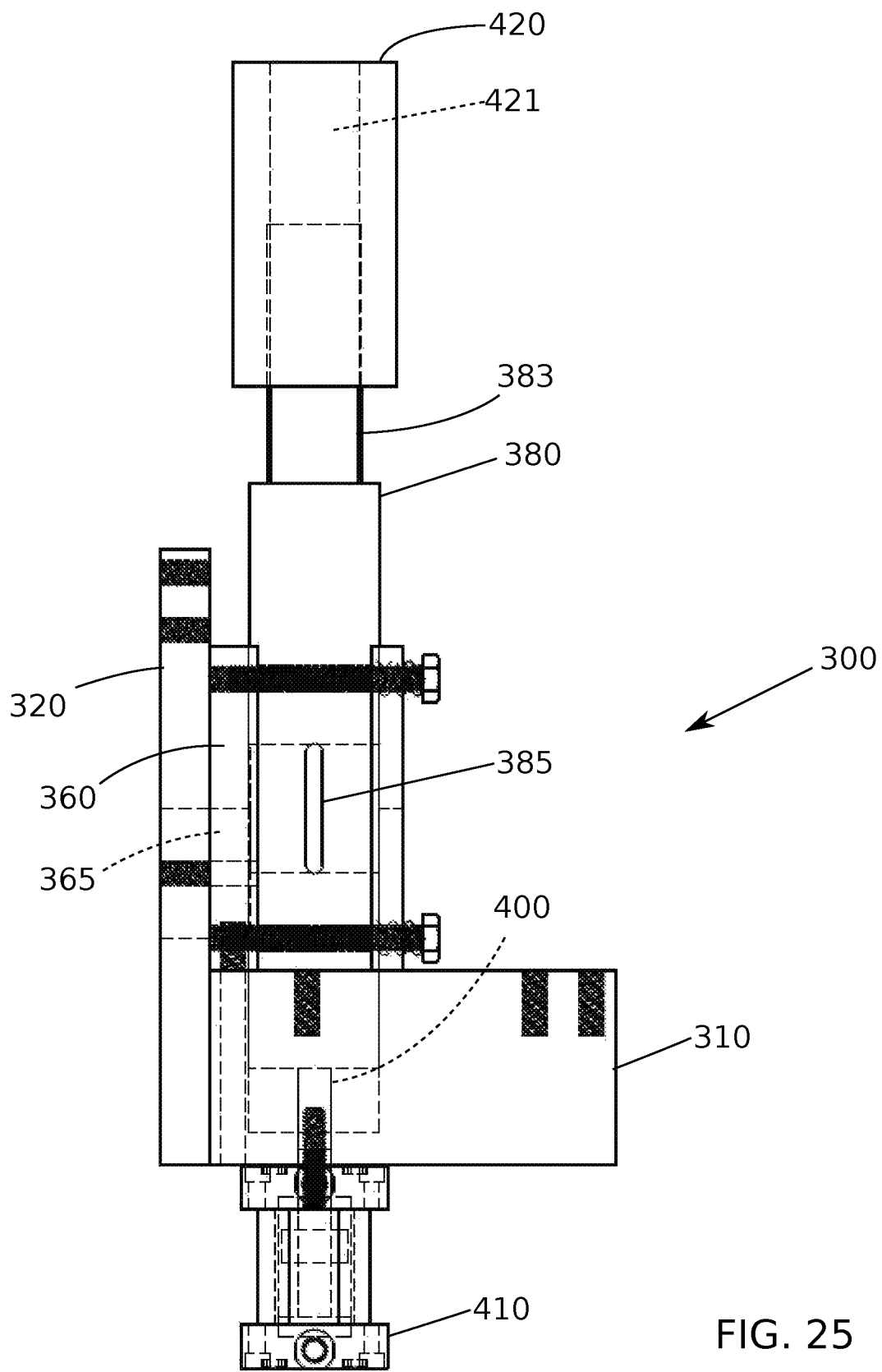
FIG. 25 is similar to FIG. 24 but shows the shaft located in a position wherein the valve assembly has an intermediate amount of flow per half revolution when open.
Figure 26:
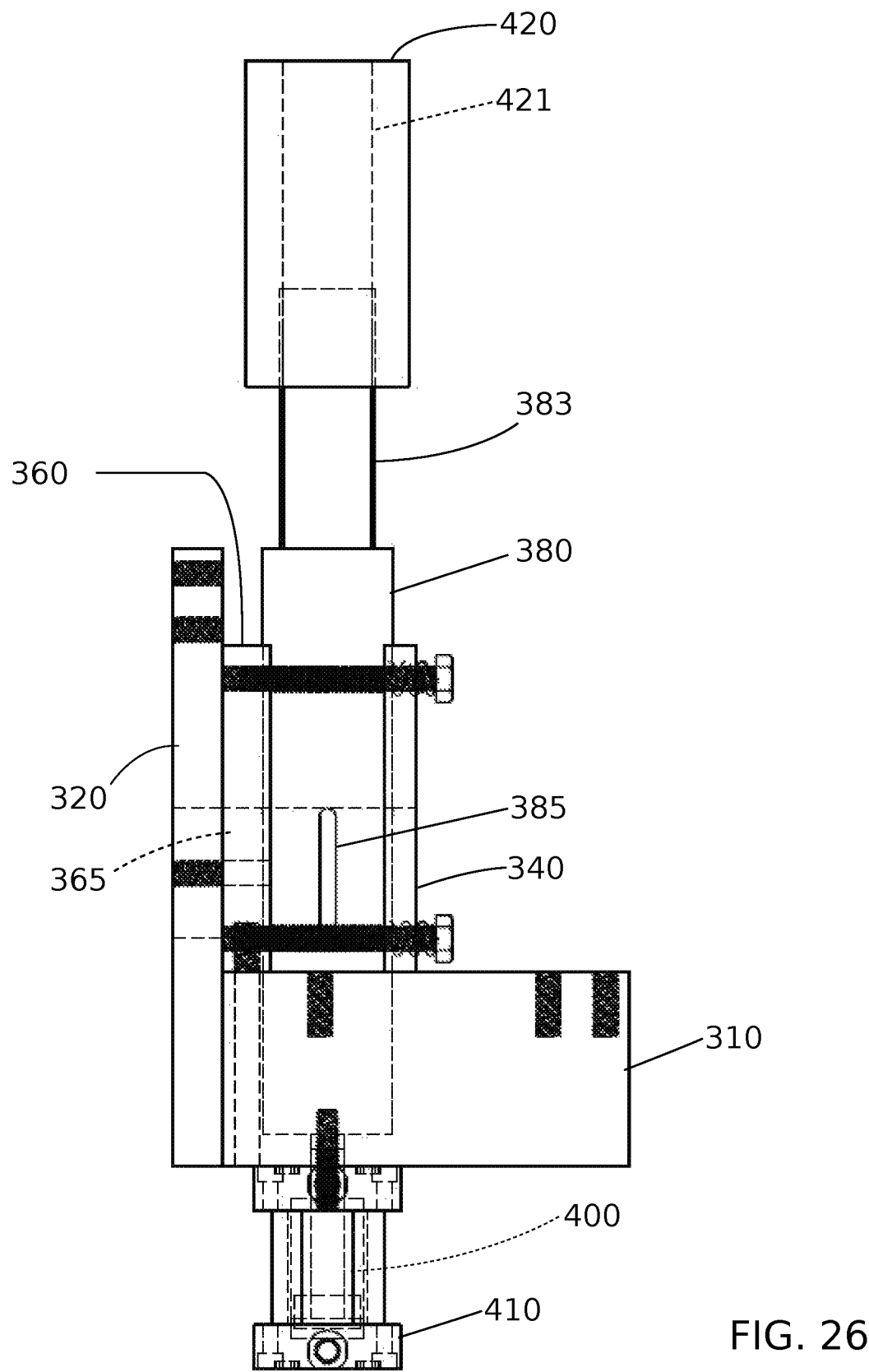
FIG. 26 is similar to FIG. 24 but shows the shaft located in a position wherein the valve assembly has a full amount of flow per half revolution when open.

A drive motor 420 is provided as seen in FIGS. 24-26. The drive motor 420 has a female end 421 with a cavity adapted to receive end 381 of the shaft 380. The interior profile of the cavity preferably matches the profile of the polygon 383. The drive motor 420 rotates which causes the shaft 380 to likewise rotate at an RPM equal to the RPM of the drive motor 420. For every revolution, the valve assembly opens two times. The shaft RPM determines how many times per minute the valve assembly is open by a factor of two.

In operation, the valve assembly 300 opens when the leading edge of the shaft passage 385 begins alignment with the leading edge of the inner guide plate passage 365. The valve assembly 300 closes when the trailing edge of the shaft passage 385 ceases to be aligned with the trailing edge of the inner guide passage 365. Thus, the rotational length of time that valve assembly is open comprises the width of the shaft passage 385 plus the width of the inner guide plate passage 365. The valve assembly 300 opens two times per revolution (or once every half revolution) as the passage 385 completely passes through the shaft 380 and is aligned twice with the inner guide passage 365 per revolution.

It is appreciated that the inner guide passage 365 (inlet passage) is aligned with the outer guide passage 345 (outlet passage), wherein when the shaft passage 385 is at all aligned with the inner guide passage 365, it is also simultaneously aligned with the outer guide passage 345. However, the outer guide serves mainly to put minor pressure on shaft 380 keeping it pressed against the inner plate and in proper location. The slot in the outer plate therefore is of an equal or greater size than the passage of both the inner plate and shaft allowing for a free flow of gas through the outer plate, shaft and inner plate.

The vertical adjustment of the shaft 380 is illustrated in FIGS. 24-32. The vertical adjustment of the shaft 380 determines the effective orifice size and accordingly how much gas can enter the expansion chamber per half revolution.

Figure 31:
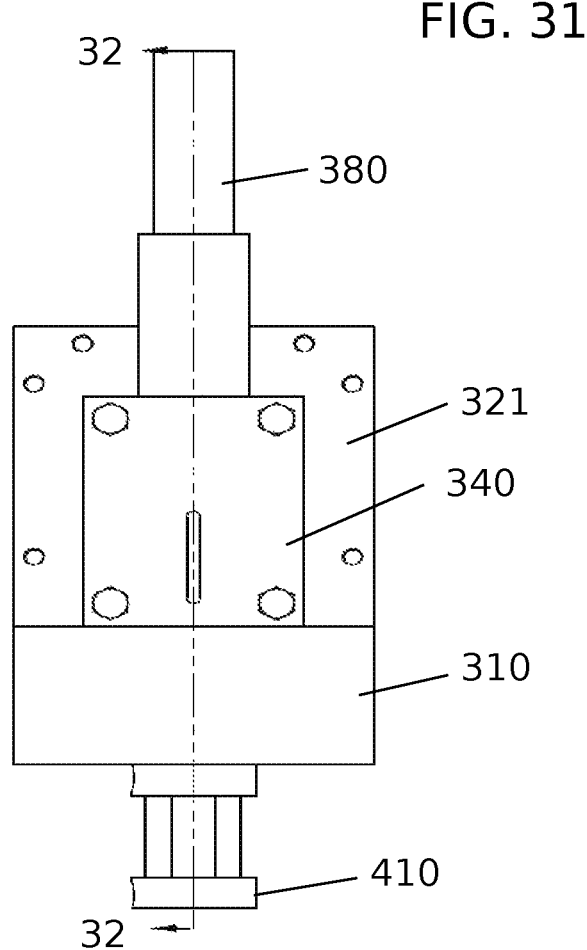
FIG. 31 is an end view of the valve assembly in a full flow position.
Figure 32:
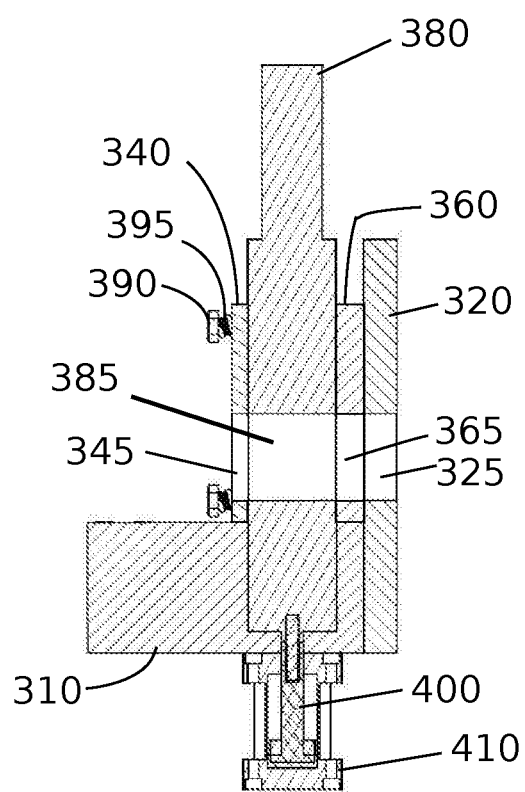
FIG. 32 is a cross-sectional view taken along line 32-32 in FIG. 31.
Figure 33:
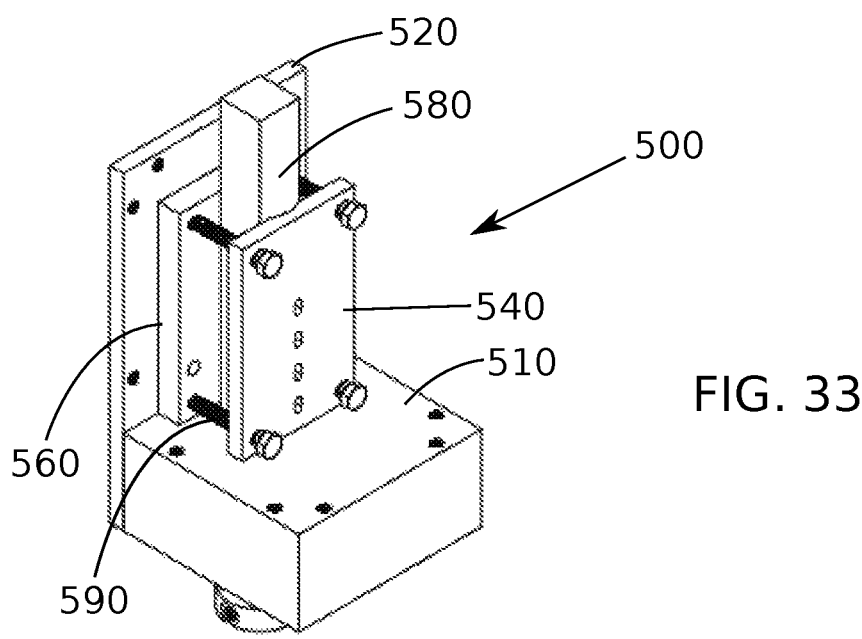
FIG. 33 is a perspective view of an alternative embodiment of the present invention.
Figure 34:
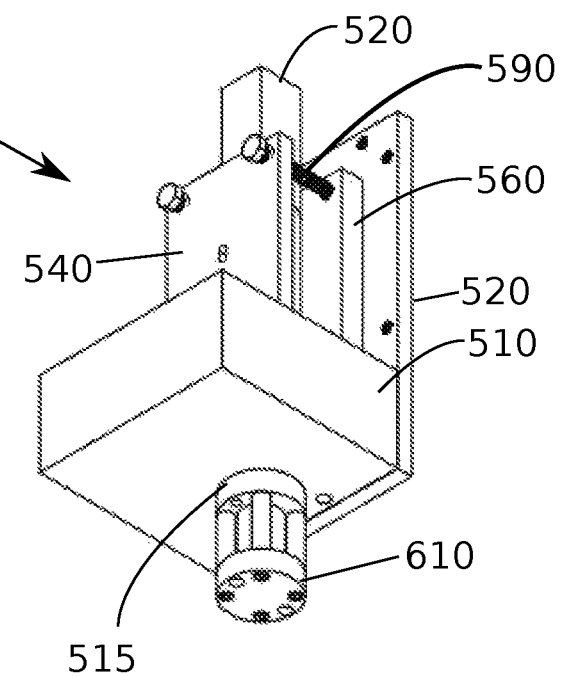
FIG. 34 is an alternative perspective view of the embodiment illustrated in FIG. 33.
Figure 35:
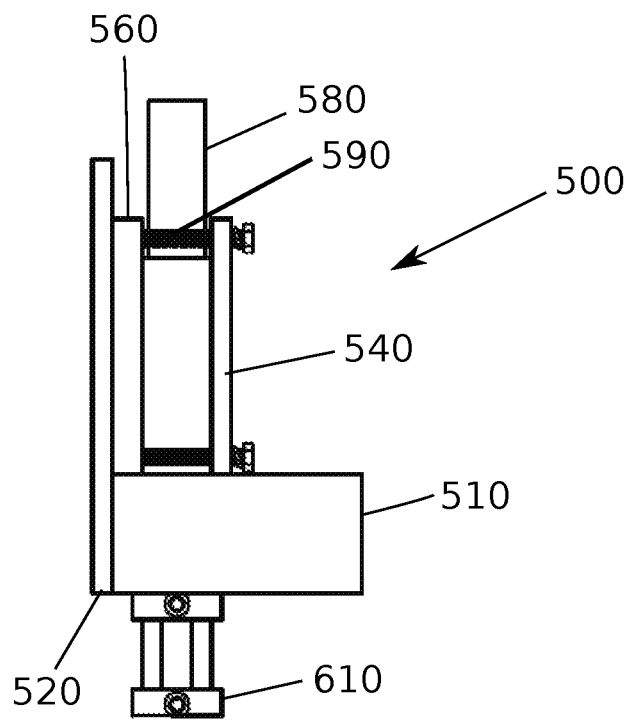
FIG. 35 is a side view of the embodiment shown in FIG. 33 showing the valve assembly in the open position.
Figure 36:
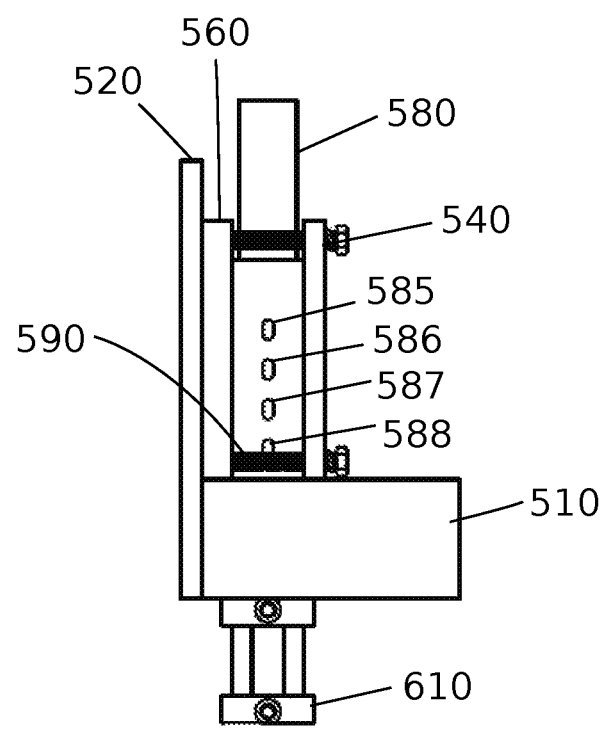
FIG. 36 is a side view of the embodiment shown in FIG. 33 showing the valve assembly in the closed position.

The shaft 380 is shown in the full flow position in FIGS. 26, 31 and 32. In this regard, the shaft passage 385 and inner guide passage 365 are 100 percent vertically aligned. Further, the end 381 of the shaft 380 is minimally received within the female end 421 of the drive motor as the shaft is not vertically shifted relative to the inner and outer guides. In the full flow position, a maximum amount of high-pressure gas can enter the expansion chamber each half revolution.

The shaft 380 is shown in the intermediate flow position in FIGS. 25, 29 and 30. In this regard, the shaft passage 385 and inner guide passage 365 are partially vertically aligned. Further, the end 381 of the shaft 380 is further received within the female end 421 (compared to the full flow position) of the drive motor as the shaft somewhat vertically shifted relative to the inner and outer guides. In the intermediate flow position, an intermediate amount of high-pressure gas can enter the expansion chamber each half revolution.

Figure 27:
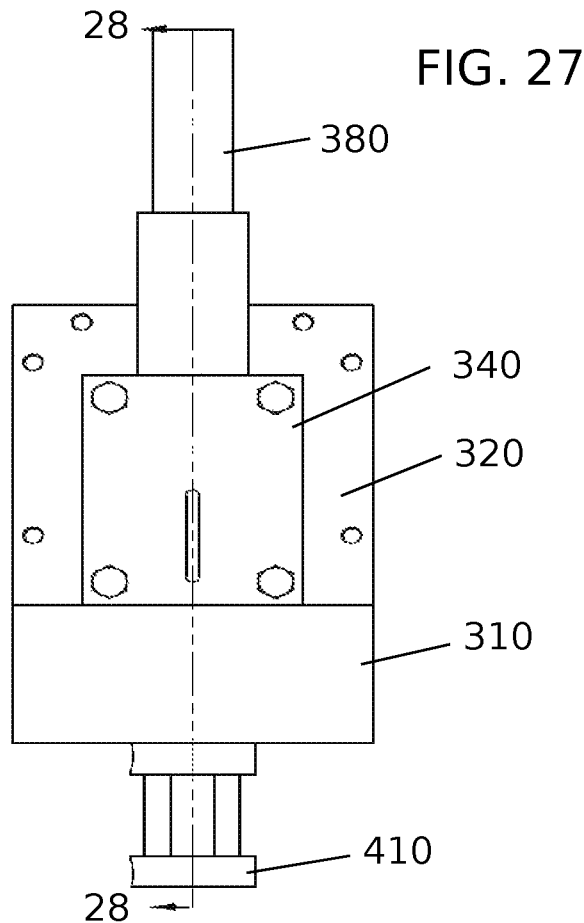
FIG. 27 is an end view of the valve assembly in a no flow position.
Figure 28:
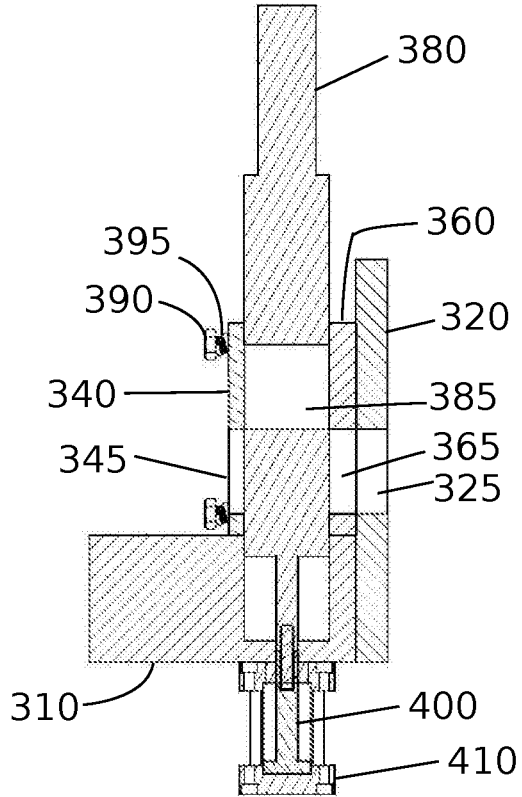
FIG. 28 is a cross-sectional view taken along line 28-28 in FIG. 27.

The shaft 380 is shown in the no flow position in FIGS. 24, 27 and 28. In this regard, the shaft passage 385 and inner guide passage 365 are not at all vertically aligned. Further, the end 381 of the shaft 380 is a male end that is received within the female end 421 of the drive motor as the shaft is fully vertically shifted relative to the inner and outer guides. In the no flow position, no amount of gas can enter the expansion chamber each half revolution as the passages do not align.

The ability of shaft 380 to move incrementally up and down against the inner plate allows for an infinite adjustment of the orifice and thus an infinite adjustment of volume/revolution.

The third variable relates to the open/closed ratio of the valve assembly. The greater the sum of the inner plate slot width plus the shaft slot width (as a percentage of the shaft overall circumference) the longer the valve is open each cycle and vice versa. In the embodiment of FIGS. 1-32, each passage is a slot having a constant width. In this regard, in this embodiment, the size of the passages could be predetermined based on expected operational parameters.

Looking now to FIGS. 33-51, it is seen that an alternative embodiment of a valve assembly 500 is illustrated. The valve assembly 500 has a base 510, and entrance plate 520, a cover (not shown), an outer guide 540, an inner guide 560, a shaft 580, connectors 590 and a positioner 610. Each of these parts will be described below.

The base 510 is best illustrated in FIGS. 33-37 and 47-53. Base 510 can have a hole 515 therethrough.

The entrance plate 520 is also best illustrate in FIGS. 33-37 and 46-51. The entrance plate 520 has four longitudinally aligned passages 525, 526, 527 and 528 therethrough. One preferred passage profile is a slot with a generally constant width (the ends may be rounded). However, it is understood that other profiles could be used without departing from the broad aspects of the present invention. The entrance plate 520 generally lies in a plane that is perpendicular to the base plate 510.

The cover (not shown) has a rail, a hole and a gas inlet. The rail has several holes therethrough for receiving screws to fasten the cover to both the base plate 510 and the entrance plate 520. The shaft 580 extends through the hole. Gas can be introduced through inlet. The gas fills the cavity defined by the cover, base plate 510 and entrance plate 520.

The outer guide 540 is best seen in FIGS. 7-33-40, 47, 49 and 51. The outer guide 540 has a top, a bottom and two sides. The outer guide has an outer face 541 and an inner face 542. The inner face 542 has a recess 543 that preferably spans all the way between the top and bottom of the guide 540. Longitudinally aligned passages 545, 546, 547 and 548 pass between the outer face 541 and the inner face 542. The passages 545, 546, 547 and 548 are preferably centrally located within the recess 543. One preferred passage profile is a slot with a generally constant width (the ends may be rounded). However, it is understood that other profiles could be used without departing from the broad aspects of the present invention.

The inner guide 560 is best seen in FIGS. 33-37, 41-46, 47, 49 and 51. The inner guide 560 has a top, a bottom and two sides. The inner guide has an outer face 561 and an inner face 562. The inner face 562 has a recess 563 that preferably spans all the way between the top and bottom of the guide 560. Four passages 565, 566, 567 and 568 pass between the outer face 561 and the inner face 562. The passages 565, 566, 567 and 568 are preferably centrally located within the recess 563. One preferred passage profile is a slot with a generally constant width (the ends may be rounded). However, it is understood that other profiles could be used without departing from the broad aspects of the present invention.

The shaft 580 is best illustrated in FIGS. 33-37 and 44-45. The shaft is preferably a linear and round shaft having a first end 581 and a second end 582. The first end 581 can have a shape, which can be polygon 583, and can be considered a male end. Four passages 585, 586, 587 and 588 are through the shaft 580 between the first and second ends, 581 and 582, respectively. One preferred passage 585 is a slot. However, it is understood that other profiles could be used without departing from the broad aspects of the present invention.

Connectors 590 and springs are used to connect secure the shaft 580 between the outer guide 540 and the inner guide 560 via connector holes in the inner and outer guides. In this regard, the shaft 580 is cradled within the recess 543 of the outer guide 540 and cradled within the recess 563 of the inner guide 560. The springs are between the connector head and the outside face 541 of the outer guide 540. In this regard, the springs provide a spring force to hold the outer guide against the shaft 580.

Figure 37:
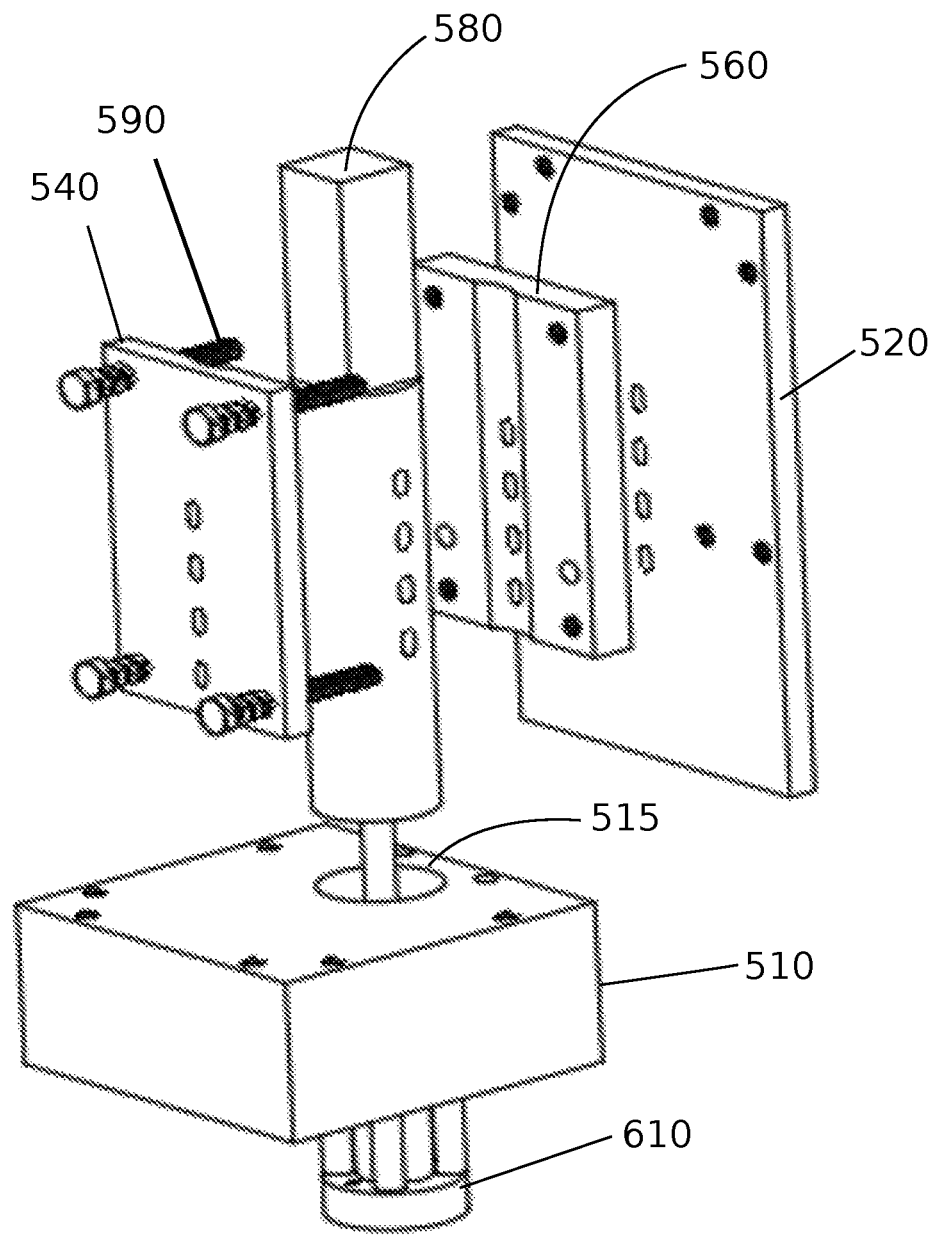
FIG. 37 is a perspective exploded view showing the valve assembly in the closed position.
Figure 38:
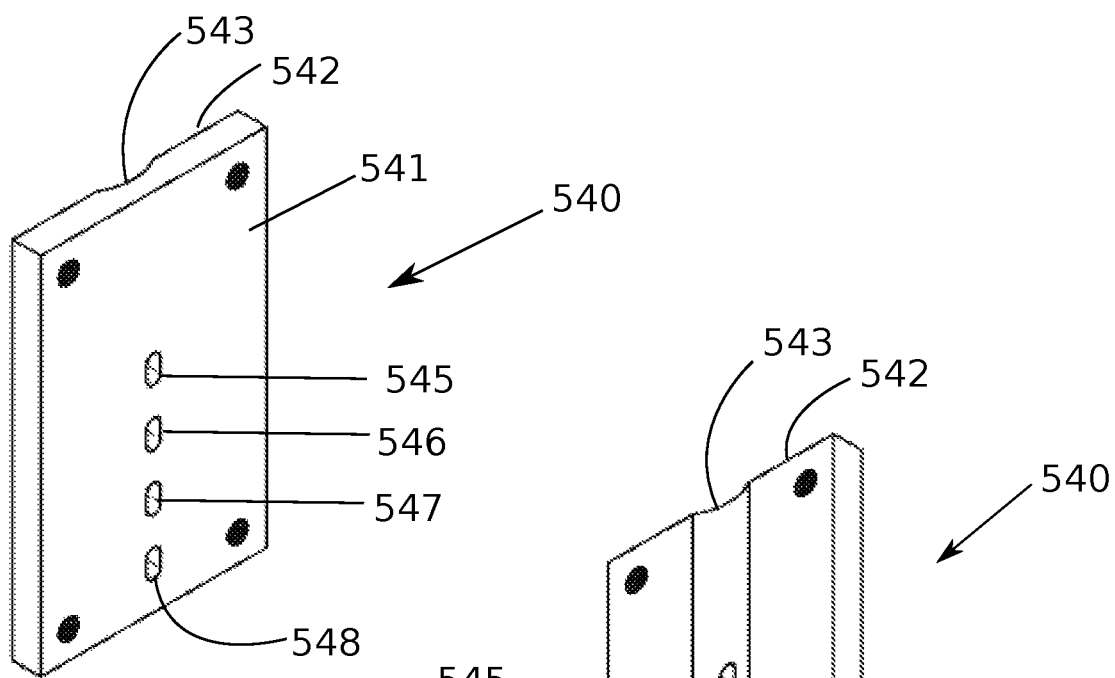
FIG. 38 is a perspective view of the outer guide of the valve assembly of FIG. 33.
Figure 39:
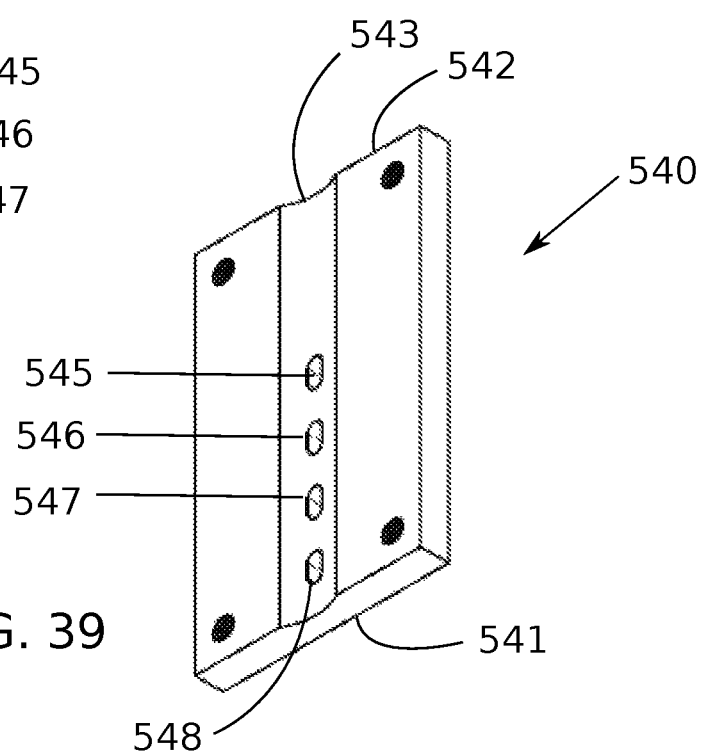
FIG. 39 is an alternative perspective view of the outer guide of the valve assembly of FIG. 33.
Figure 40:
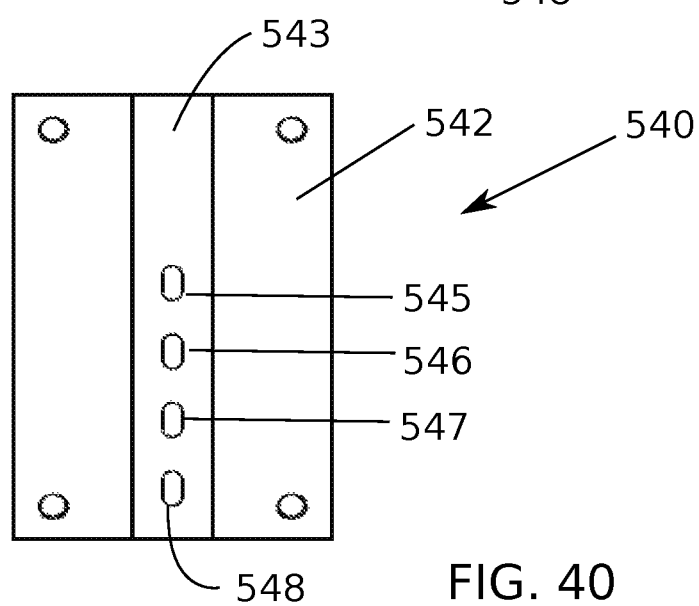
FIG. 40 is a side view of the outer guide of the valve assembly of FIG. 33.
Figure 41:
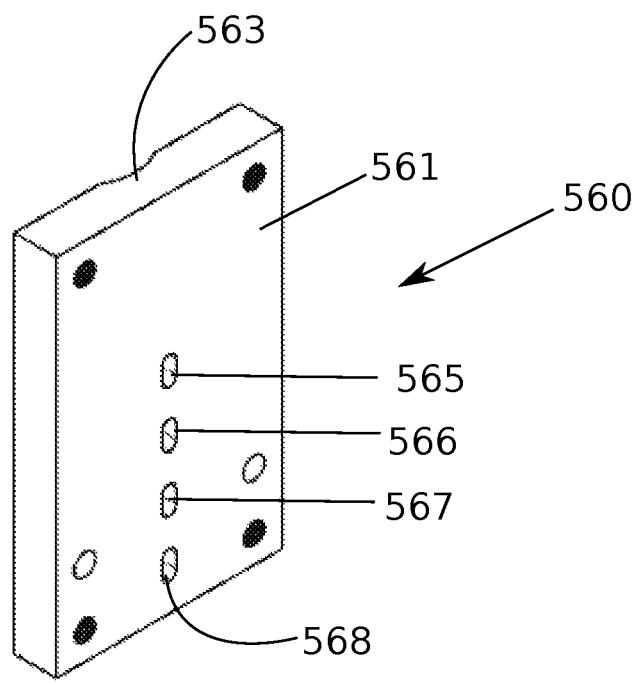
FIG. 41 is a perspective view of the inner guide of the valve assembly of FIG. 33.
Figure 42:
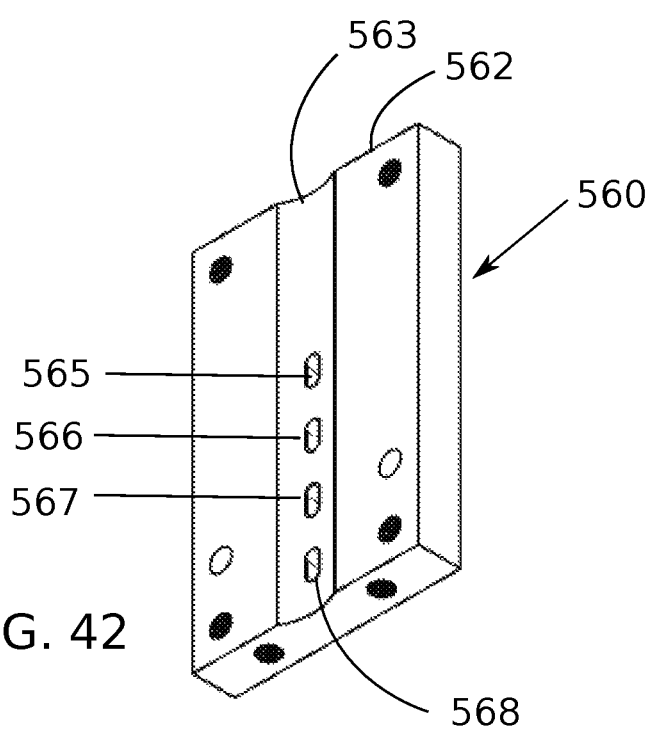
FIG. 42 is an alternative perspective view of the inner guide of the valve assembly of FIG. 33.
Figure 43:
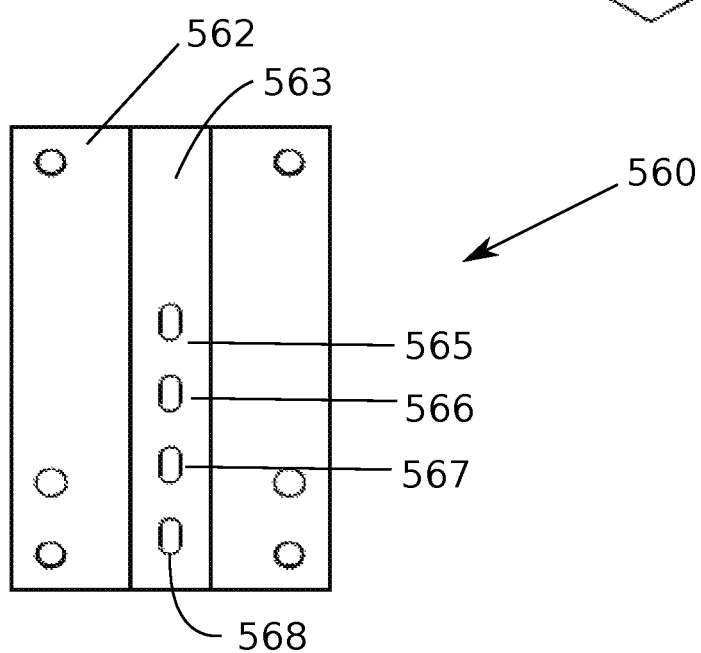
FIG. 43 is a side view of the inner guide of the valve assembly of FIG. 33.
Figure 44:
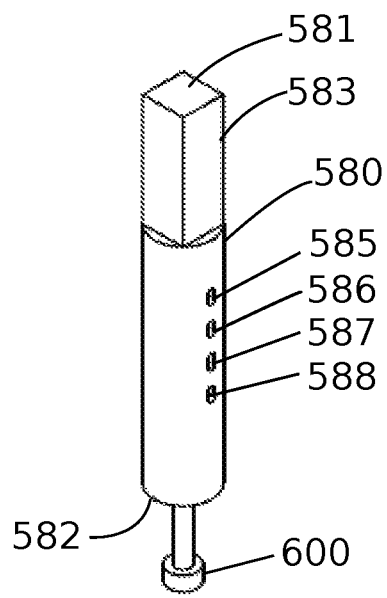
FIG. 44 is a perspective view of the shaft of the valve assembly of FIG. 33.
Figure 45:
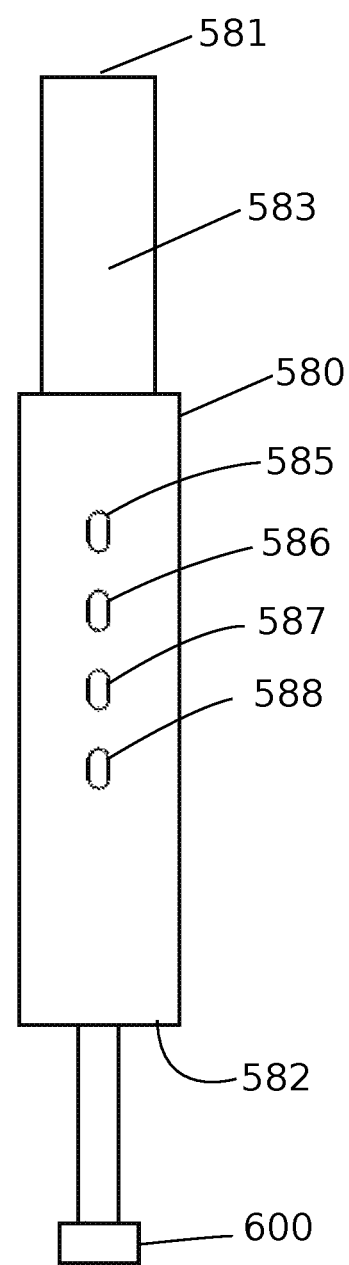
FIG. 45 is a side view of the shaft of the valve assembly of FIG. 33.

A piston rod 600 is provided as seen in FIGS. 37, 44 and 45. The piston rod 600 connects the shaft 580 with a positioner 610. The positioner 610 is shown in FIGS. 33-37, 47 and 51. The positioner 610 is located below the base 510 and the piston rod 600 extends through a hole in the base to linearly adjust the location of the shaft 580 relative to the outer guide 540 and inner guide 560.

A drive motor (not shown) has a female end with a cavity adapted to receive end 581 of the shaft 580. The interior profile of the cavity preferably matches the profile of the polygon 583. The drive motor rotates which causes the shaft 580 to likewise rotate at an RPM equal to the RPM of the drive motor. For every revolution, the valve assembly opens two times. The shaft RPM determines how many times per minute the valve assembly is open by a factor of two.

In operation, the valve assembly 500 opens when the leading edge of the shaft passages 585, 586, 587 and 588 begin alignment with the leading edge of the inner guide plate passages 565, 566, 567 and 568, respectively. The valve assembly 500 closes when the trailing edge of the shaft passages 585, 586, 587 and 588 cease to be aligned with the trailing edge of the inner guide passages 565, 566, 567 and 568, respectively. Thus, the rotational length of time that valve assembly is open comprises the width of the shaft passages 585, 586, 587 and 588 plus the width of the inner guide plate passages 565, 566, 567 and 568.

It is appreciated that the inner guide passages 565, 566, 567 and 568 are aligned with the outer guide passages 545, 546, 547 and 548, wherein when the shaft passages 585, 586, 587 and 588 are at all aligned with the inner guide passage passages 565, 566, 567 and 568, they are also simultaneously aligned with the outer guide passages 545, 546, 547 and 548. However, the outer guide passages can be larger than the inner guide passage (must be at least as big) so that the outer guide does not inhibit a free flow of gas through the valve when the valve is open. The valve assembly 500 opens two times per revolution (or once every half revolution) as the passages 585, 586, 587 and 588 completely pass through the shaft 580.

The vertical adjustment of the shaft 580 is illustrated in FIGS. 46-51. The vertical adjustment of the shaft 580 determines the effective orifice size and accordingly how much gas can enter the expansion chamber per half revolution.

The shaft 580 is shown in the full flow position in FIGS. 50 and 51. In this regard, the shaft passages 585, 586, 587 and 588 and inner guide plate passages 565, 566, 567 and 568 are 100 percent vertically aligned. In the full flow position, a maximum amount of gas can enter the expansion chamber each half revolution.

Figure 48:
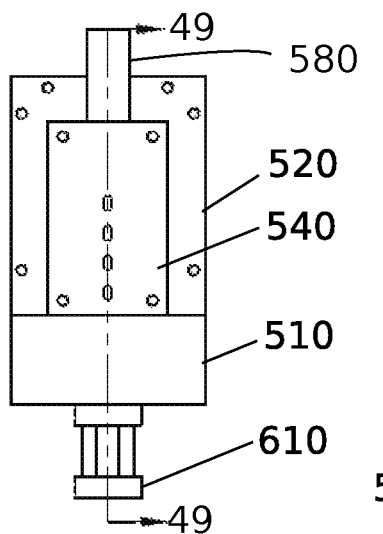
FIG. 48 is an end view of the valve assembly of FIG. 33 with the shaft in an intermediate flow position.
Figure 49:
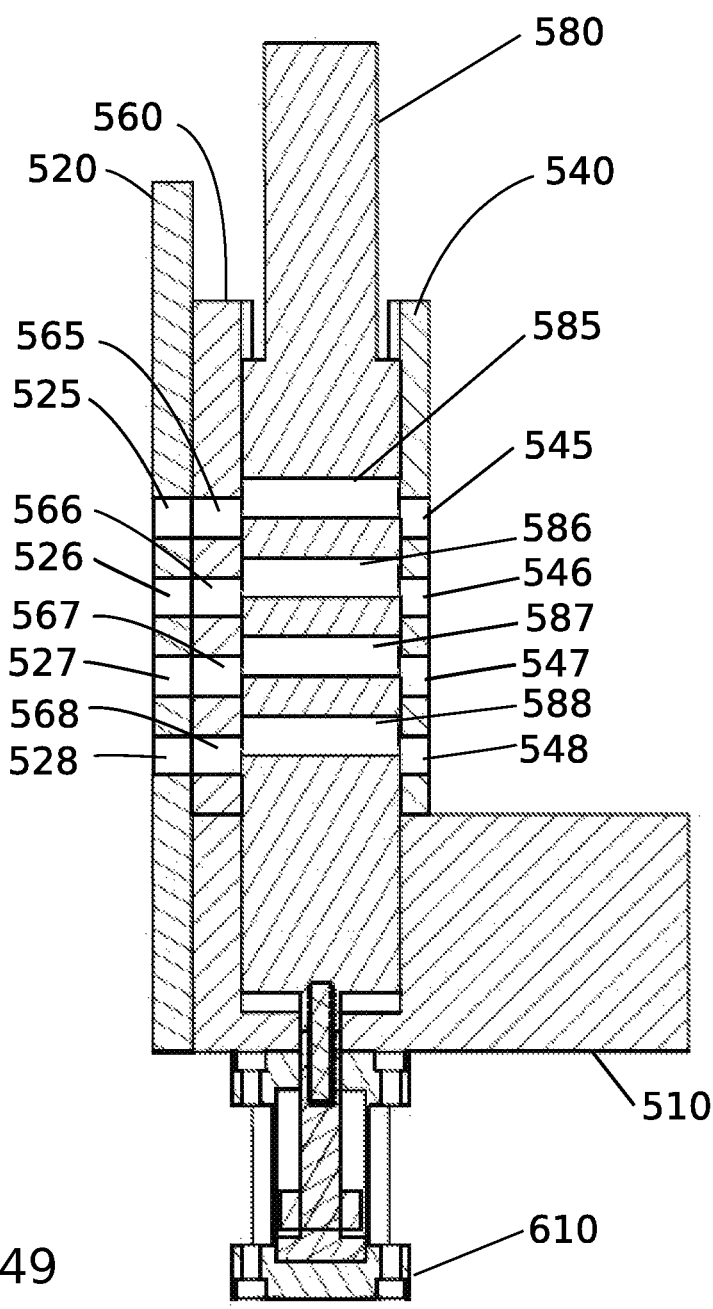
FIG. 49 is a cross-sectional view taken along line 49-49 in FIG. 48.

The shaft 580 is shown in the intermediate flow position in FIGS. 48 and 49. In this regard, the shaft passages 585, 586, 587 and 588 and inner guide plate passages 565, 566, 567 and 568 are partially vertically aligned. In the intermediate flow position, an intermediate amount of gas can enter the expansion chamber each half revolution.

Figure 46:
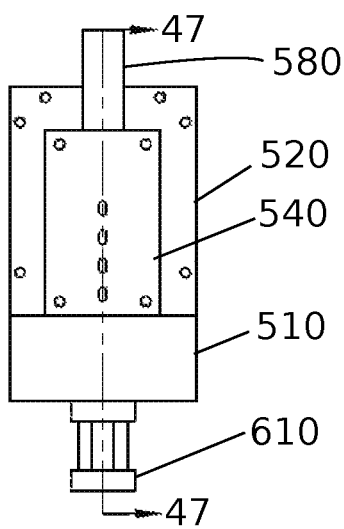
FIG. 46 is an end view of the valve assembly of FIG. 33 with the shaft in a no flow position.
Figure 47:
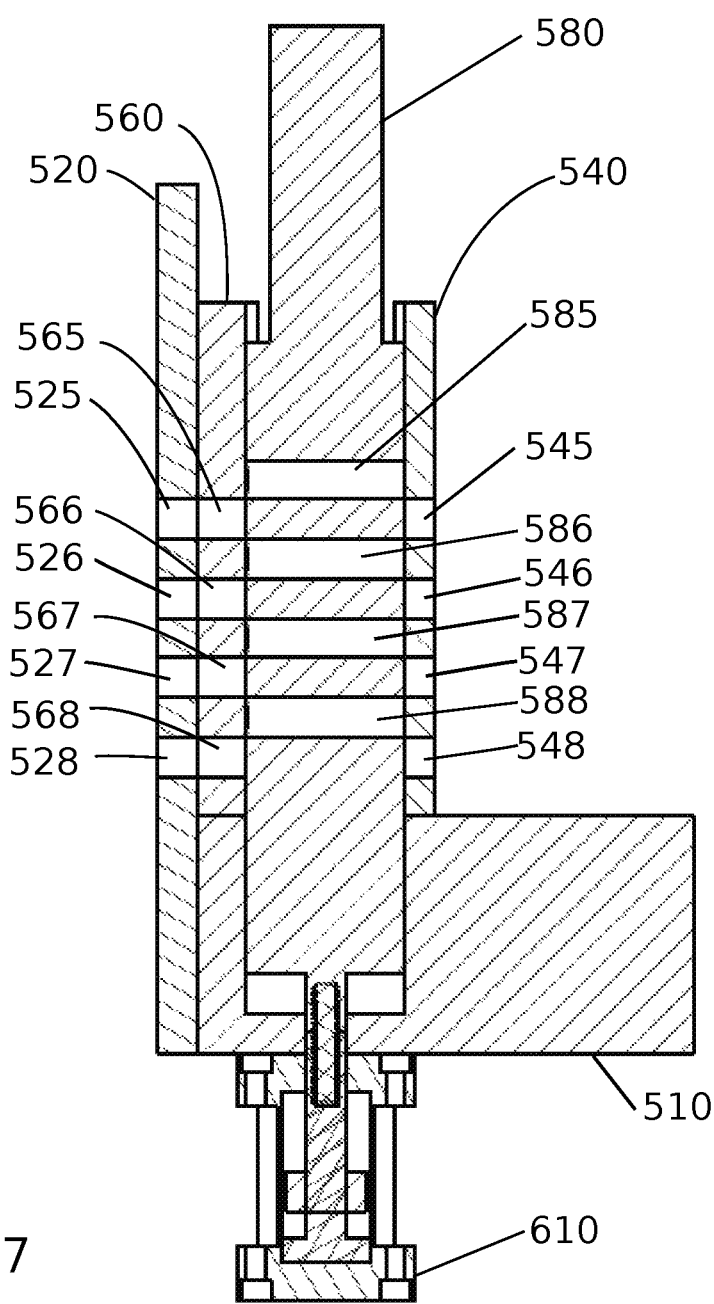
FIG. 47 is a cross-sectional view taken along line 47-47 in FIG. 46.

The shaft 580 is shown in the no flow position in FIGS. 46—and 47. In this regard, the shaft passages 585, 586, 587 and 588 and inner guide plate passages 565, 566, 567 and 568 are not at all vertically aligned. In the no flow position, a no amount of gas can enter the expansion chamber each half revolution as the passages do not align.

The ability of shaft 580 to move incrementally up and down against the inner plate allows for an infinite adjustment of the orifice and thus an infinite adjustment of volume/revolution.

The third variable relates to the open/closed ratio of the valve assembly. The greater the sum of the inner plate slot width plus the shaft slot width (as a percentage of the shaft overall circumference) the longer the valve is open each cycle and vice versa. In the embodiment of FIGS. 33-51, each passage is a slot having a constant width. In this regard, in this embodiment, the size of the passages could be predetermined based on expected operational parameters.

Looking now to FIGS. 52-62, it is seen that an alternative embodiment of a valve assembly 700 is illustrated. The valve assembly 700 has a base 710, and entrance plate 720, a cover 730, an outer guide 740, an inner guide 760, a shaft 780, connectors 790 and a positioner 810. Each of these parts will be described below.

Figure 52:
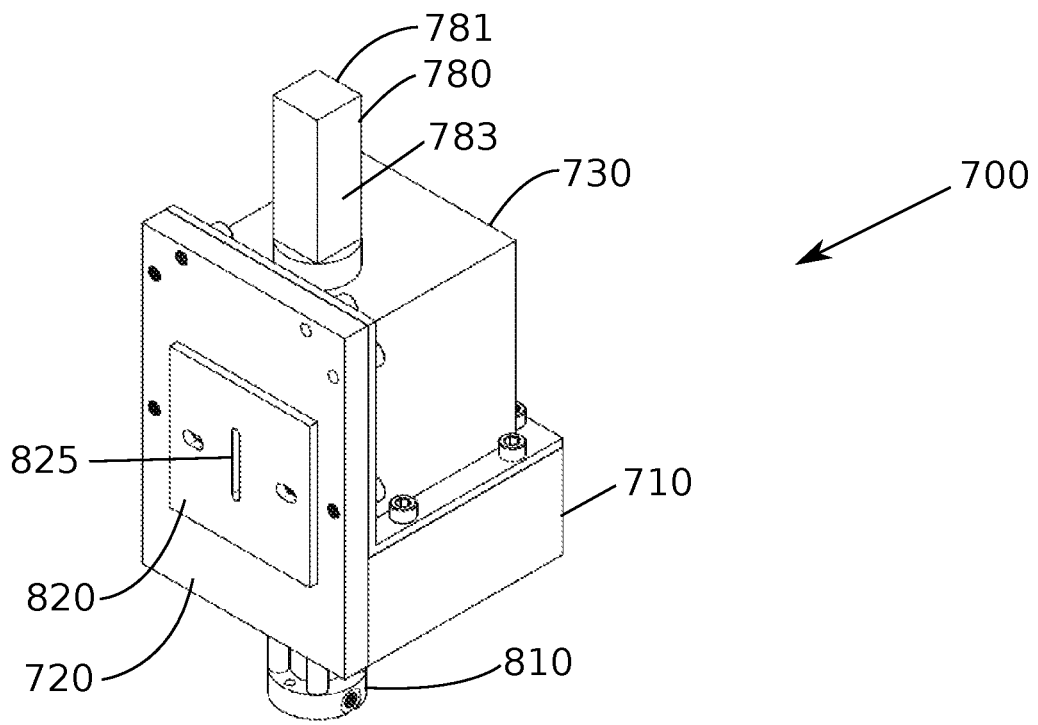
FIG. 52 is a perspective view of an alternative embodiment of the present invention.

The base 710 is best illustrated in FIG. 52. Base 710 can have a hole therethrough that allows for positioner 810 to adjust shaft 780 upward and downward thereby controlling the flow volume through the valve.

The entrance plate 720 is also best illustrate in FIGS. 52-56. The entrance plate 720 has a passage 725 therethrough. One preferred passage profile is a slot with a generally constant width (the ends may be rounded). However, it is understood that other profiles could be used without departing from the broad aspects of the present invention. The entrance plate 720 generally lies in a plane that is perpendicular to the base plate 710.

The cover 730 has a rail, a hole and a gas inlet. A portion of the cover is seen in FIG. 52. The rail has several holes therethrough for receiving screws to fasten the cover to both the base plate 710 and the entrance plate 720. The shaft 780 extends through the hole. Gas can be introduced through the inlet. The gas fills the cavity defined by the cover 730, base plate 710 and entrance plate 720.

Figure 56:
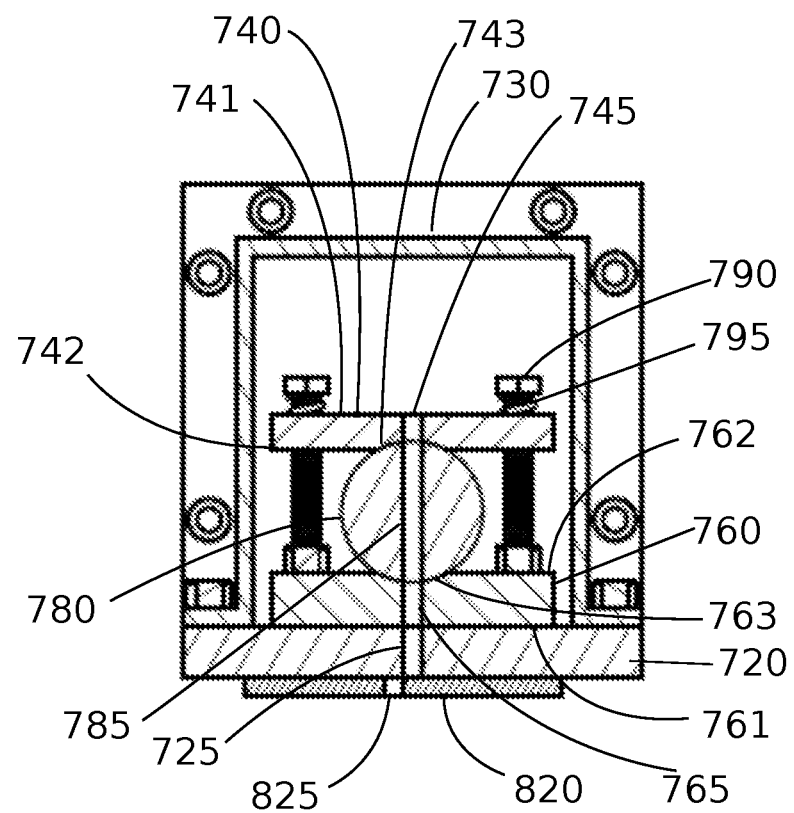
FIG. 56 is a cross-sectional view taken along line 56-56 in FIG. 55.

The outer guide 740 is best seen in FIG. 56. The outer guide 740 has a top, a bottom and two sides. The outer guide has an outer face 741 and an inner face 742. The inner face 742 has a recess 743 that preferably spans all the way between the top and bottom of the guide 740. A passage 745 passes between the outer face 741 and the inner face 742. The passage 745 is preferably centrally located within the recess 743. One preferred passage profile is a slot with a generally constant width (the ends may be rounded). However, it is understood that other profiles could be used without departing from the broad aspects of the present invention.

The inner guide 760 is best seen in FIG. 56. The inner guide 760 has a top, a bottom and two sides. The inner guide has an outer face 761 and an inner face 762. The inner face 762 has a recess 763 that preferably spans all the way between the top and bottom of the guide 760. A passage 765 between the outer face 761 and the inner face 762. The passage 765 is preferably centrally located within the recess 763. A preferred passage profile is illustrated in FIGS. 57-62. The passage 765 has a trapezoidal shape with first end 766 with a first end width and a second end 767 with a second end width. The sides are preferably mirrored wherein they have equal and opposite slopes relative to a passage longitudinal axis. The first end width is greater than the second end width.

The shaft 780 is best illustrated in FIGS. 52-56. The shaft is preferably a linear and round shaft having a first end 781 and a second end 782. The first end 781 can have a shape, which can be polygon 783. A passage 785 passes through the shaft 780. A preferred passage profile is illustrated in FIGS. 57-62. The passage 785 has a trapezoidal shape with first end 786 with a first end width and a second end 787 with a second end width. The sides are preferably mirrored wherein they have equal and opposite slopes relative to a passage longitudinal axis. The first end width is smaller than the second end width.

Connectors 790 and springs 795 are used to connect secure the shaft 780 between the outer guide 740 and the inner guide 760 via connector holes in the inner and outer guides. In this regard, the shaft 780 is cradled within the recess 743 of the outer guide 740 and cradled within the recess 763 of the inner guide 760. The springs are between the connector head and the outside face 741 of the outer guide 740. In this regard, the springs provide a spring force to hold the outer guide against the shaft 780.

A piston rod (not shown) connects the shaft 780 with a positioner 810. The positioner 810 is located below the base 710 and the piston rod extends through a hole in the base to linearly adjust the location of the shaft 780 relative to the outer guide 740 and inner guide 760.

A drive motor (not shown) has a female end with a cavity adapted to receive end 781 of the shaft 780. The interior profile of the cavity preferably matches the profile of the polygon 783. The drive motor rotates which causes the shaft 780 to likewise rotate at an RPM equal to the RPM of the drive motor. For every revolution, the valve assembly opens two times. The shaft RPM determines how many times per minute the valve assembly is open by a factor of two.

Figure 57:
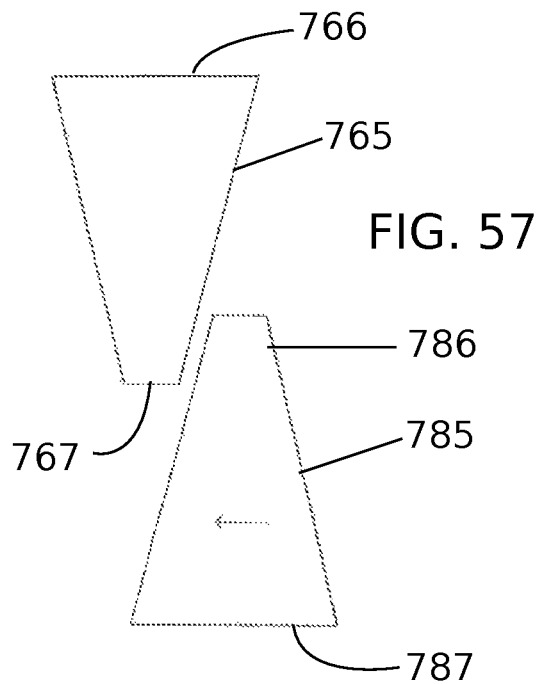
FIG. 57 is a schematic drawing showing slot profiles of both the shaft and the inner plate in a low flow position before the valve opens.
Figure 58:
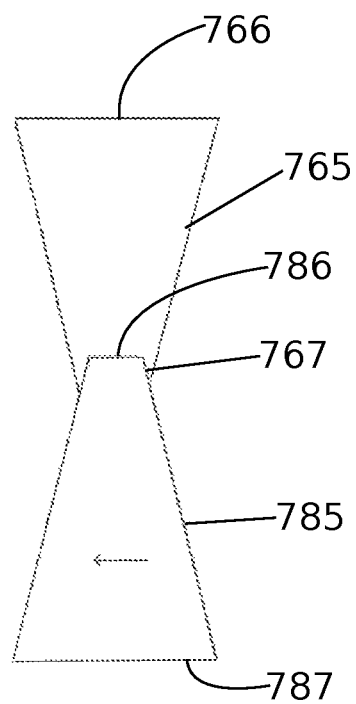
FIG. 58 is similar to FIG. 57 but shows the valve in an open position.
Figure 59:
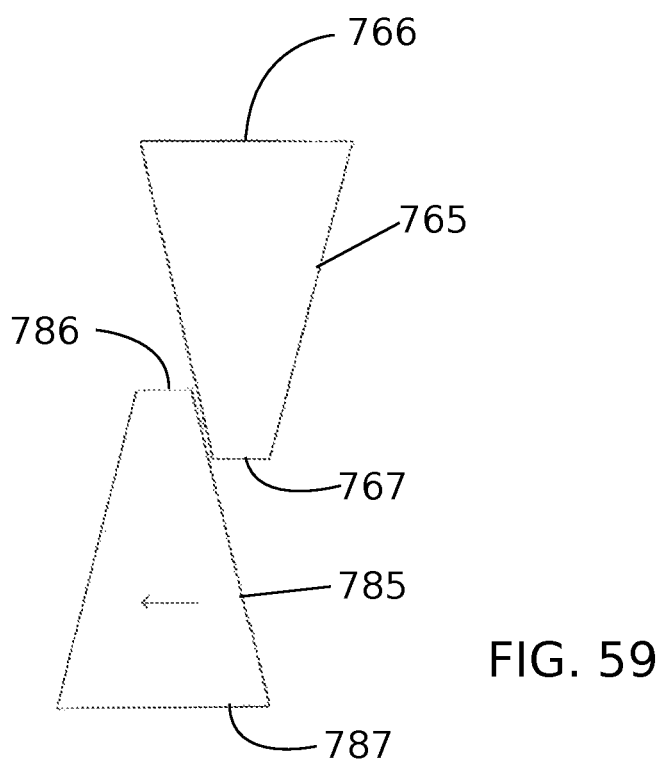
FIG. 59 is similar to FIG. 57 but shows the valve in the closed position after the valve was open.
Figure 60:
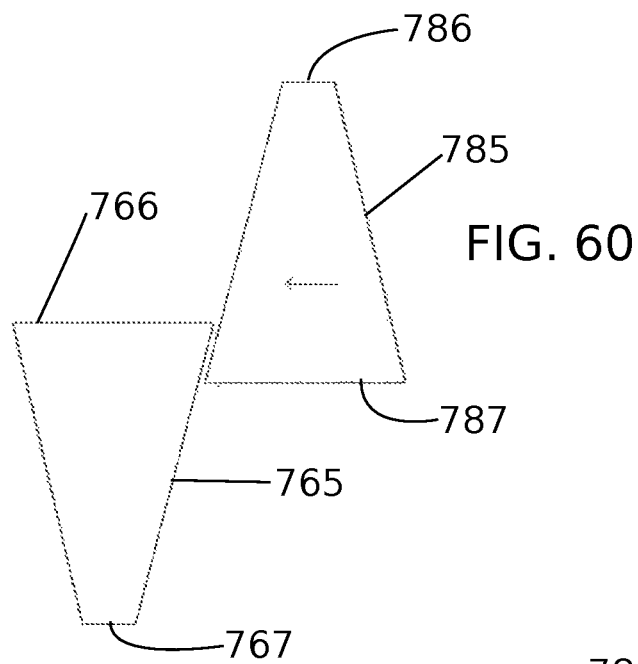
FIG. 60 is a schematic drawing showing the same slot profiles of FIGS. 57-59 but now showing the valve in a high flow position before the valve opens.
Figure 61:
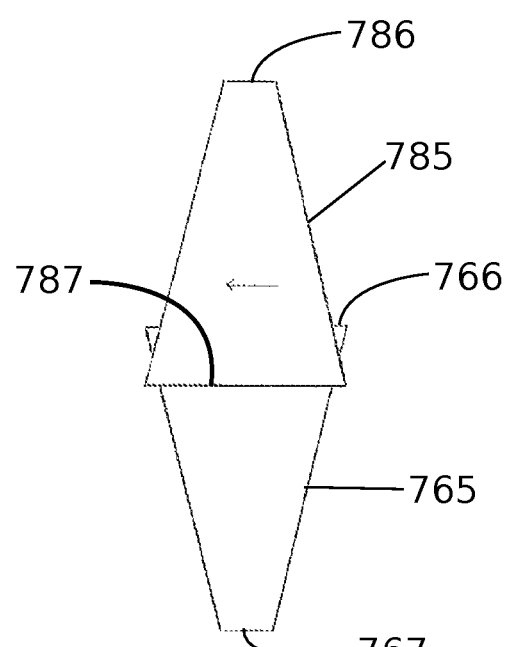
FIG. 61 is similar to FIG. 60 but shows the valve in an open position.
Figure 62:
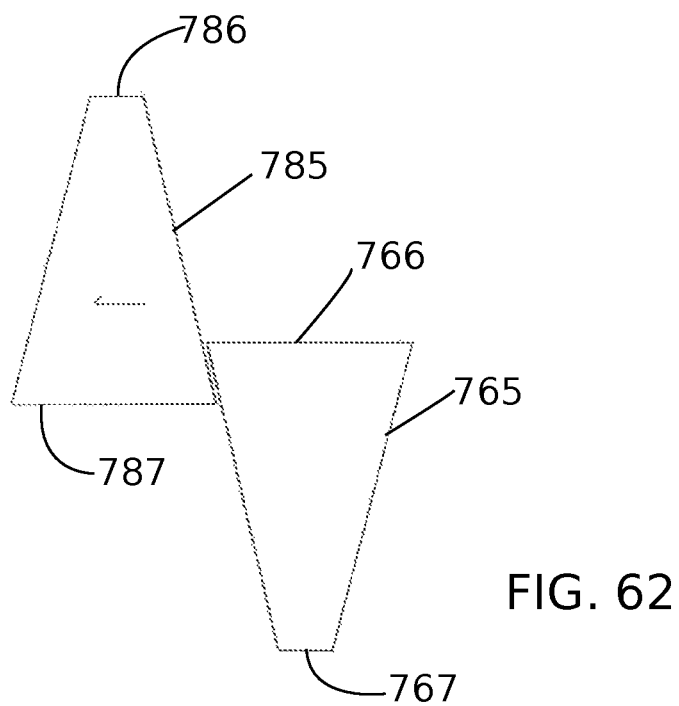
FIG. 62 is similar to FIG. 60 but shows the valve in the closed position after the valve was open.

In operation, the valve assembly 700 opens when the leading edge of the shaft passage785 begins alignment with the leading edge of the inner guide plate passages 765. The valve assembly 700 closes when the trailing edge of the shaft passage 785 ceases to be aligned with the trailing edge of the inner guide passage 765. Thus, the rotational length of time the valve assembly is open comprises the width of the shaft passage 785 plus the width of the inner guide plate passage 765 at their relative widest aligned portions. Hence, upon comparison of FIGS. 57-59 with FIGS. 60-62, it is seen how the length of time the valve is opened per revolution (the open/closed ratio) can be adjusted by adjusting the location of the shaft 780 relative to the inner guide 760 so that the overlap of respective passages 785 and 765 are adjusted. FIGS. 57-59 show a lesser open/close ratio and FIGS. 60-62 show a larger open/close ratio. In FIGS. 57 and 60, the valve is shown just before opening. In FIGS. 58 and 61, the valve is shown in an open position. In FIGS. 59 and 62, the valve is shown just after closing.

It is appreciated that when the inner guide passage 765 is aligned with the shaft passage 785, the opening in the outer guide passage is sufficiently wide enough to allow for a free flow of gas through the valve. The valve assembly opens two times per revolution (or once every half revolution) as the passage 785 passes completely through the shaft 580.

Figure 53:
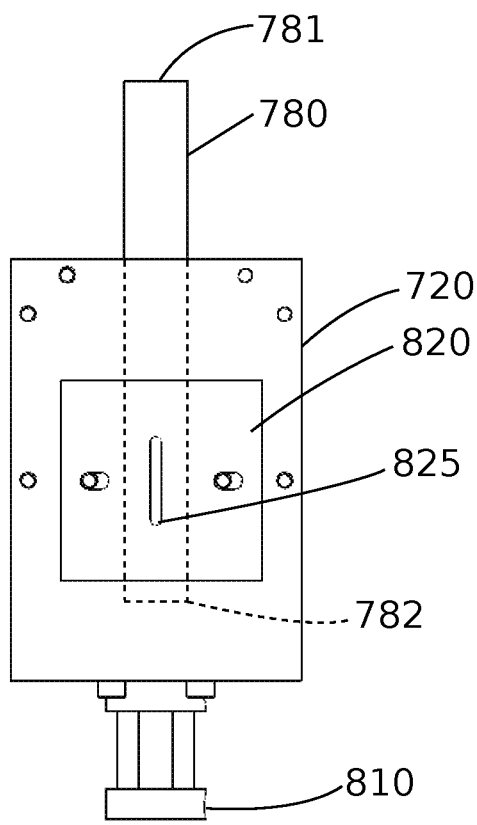
FIG. 53 is a rear view of the embodiment illustrated in FIG. 52 showing the gate in a fully open position.
Figure 54:
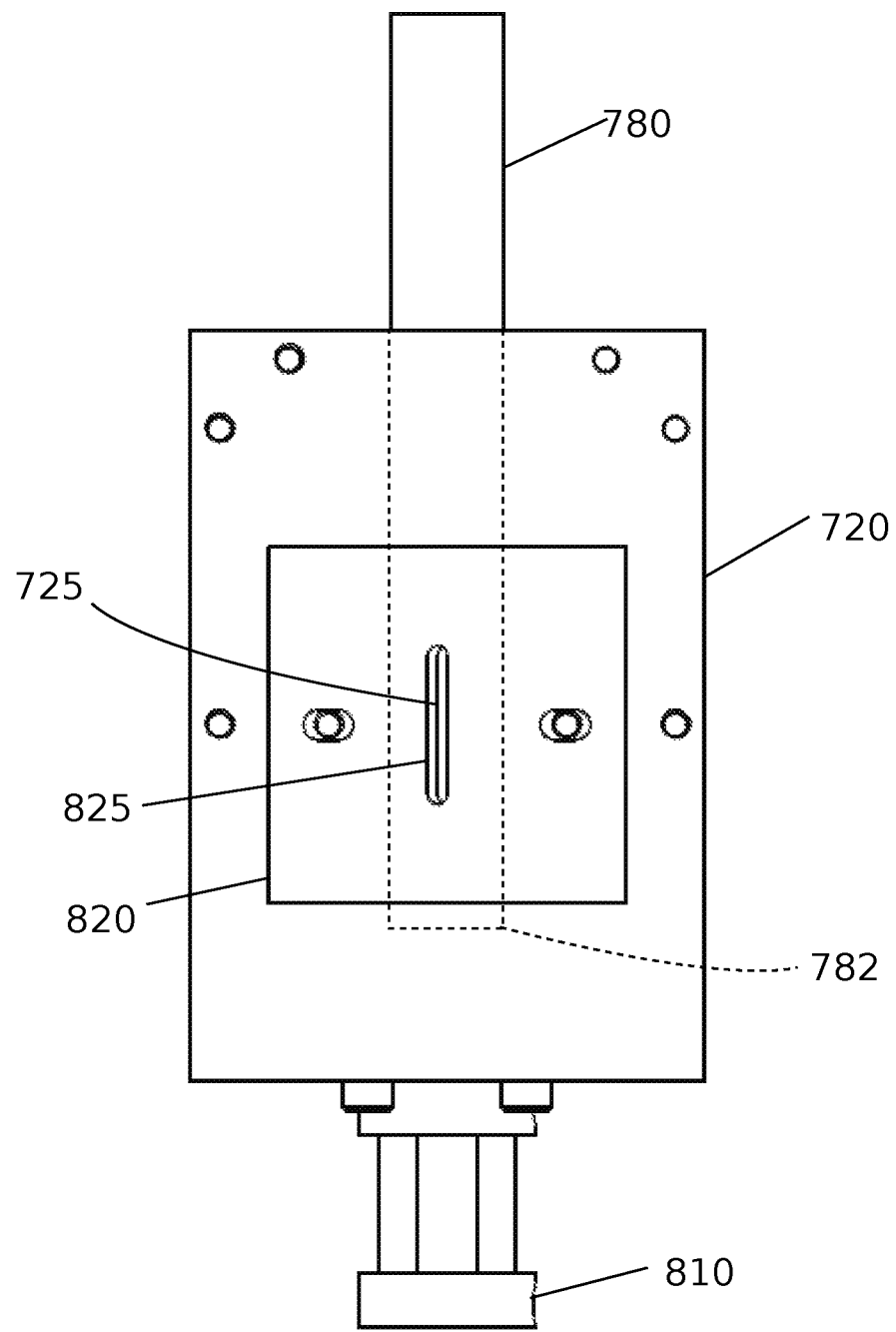
FIG. 54 is similar to FIG. 53 but shows the gate in a partially open position.
Figure 55:
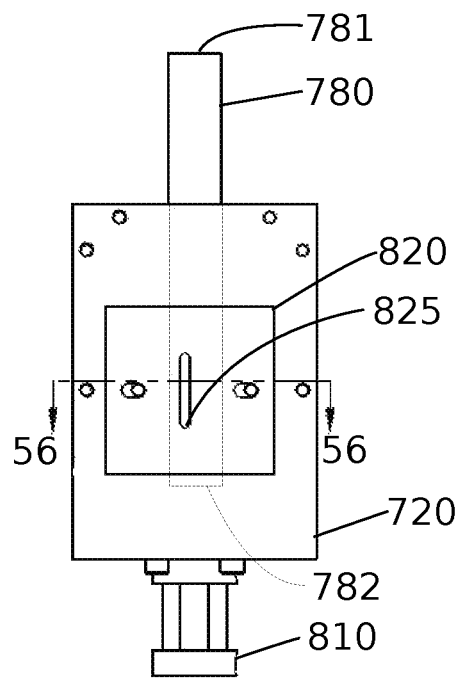
FIG. 55 is similar to FIG. 53 but shows the gate in a fully closed position.

A gate 820 with a gate passage 825 is provided and is connected to the back of the entrance plate 720 as seen in FIGS. 52-56. The gate 825 can be moved so that the passage 825 is in more or less alignment with the entrance plate passage 725. FIG. 53 shows the full flow position, FIG. 54 shows the intermediate flow position and FIGS. 55 and 56 shows the no flow position. In this regard, the relationship of gate 820 and gate passage 825 act as an orifice. The location of the gate 820 in relationship to gate passage 825 controls the effective passage size of the valve assembly so that the volume of gas entering the expansion chamber per cycle is controlled as RPMs increase or decrease.

Looking now at FIGS. 63-68, it is seen that a further alternative embodiment is illustrated. In this embodiment, an inner guide passage 900 is provided having a trapezoidal shape with first end 901 with a first end width and a second end 902 with a second end width. The sides are preferably mirrored wherein they have equal and opposite slopes relative to a passage longitudinal axis. The first end width is greater than the second end width.

A shaft passage 910 having a first end 911 and a second end 912 is also illustrated. The passage 910 has a generally constant width between ends 911 and 912 expect for rounding at the ends.

Figure 63:
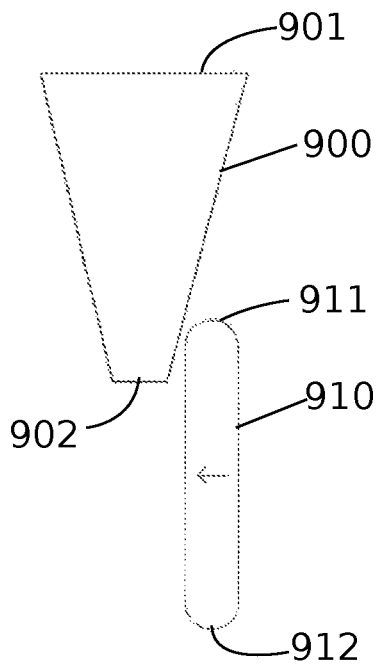
FIG. 63 is a schematic drawing showing alternative slot profiles and showing the valve in a low flow position before the valve opens.
Figure 64:
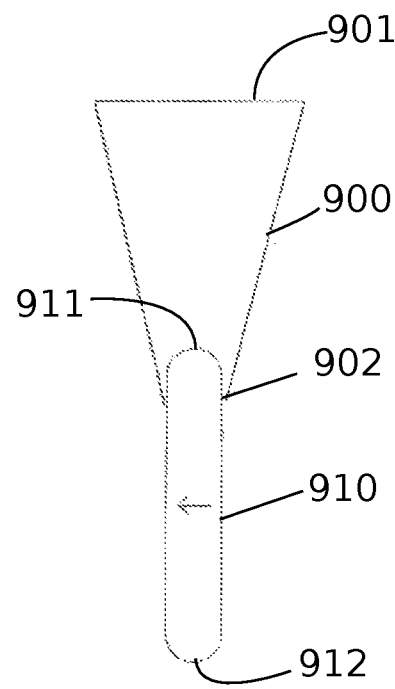
FIG. 64 is similar to FIG. 63 but shows the valve in an open position.
Figure 65:
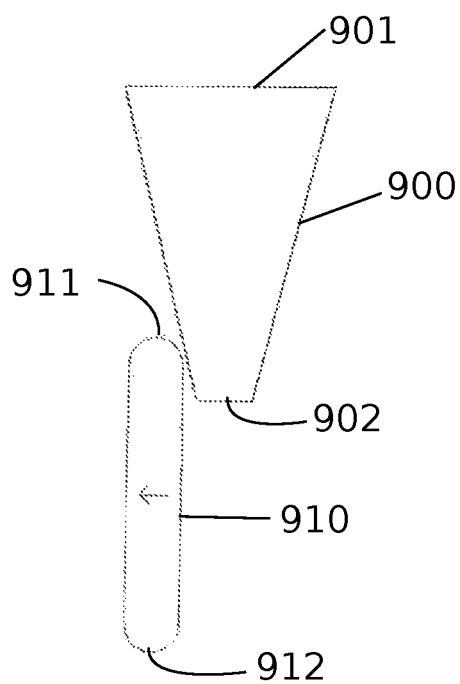
FIG. 65 is similar to FIG. 63 but shows the valve in the closed position after the valve was open.
Figure 66:
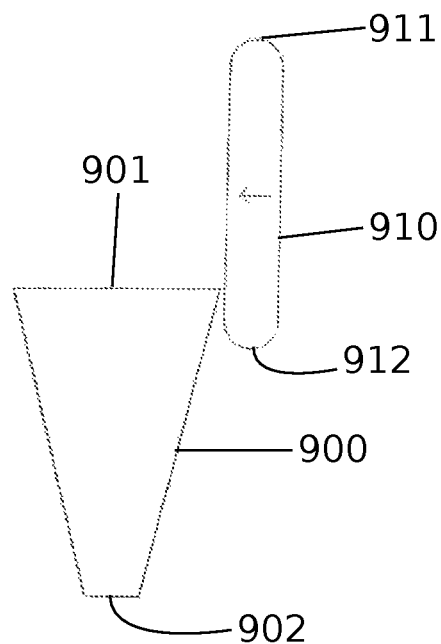
FIG. 66 is a schematic drawing showing the same slot profiles of FIGS. 63-65 but now showing the valve in a high flow position before the valve opens.
Figure 67:
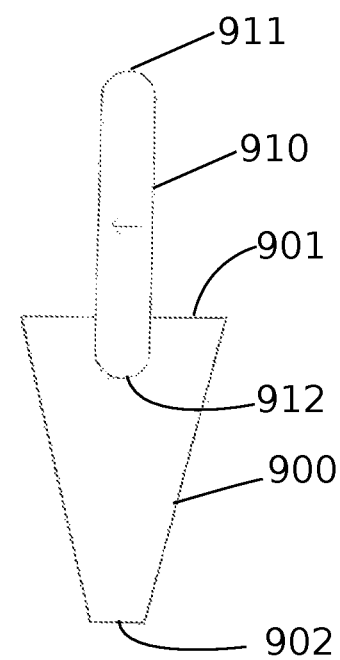
FIG. 67 is similar to FIG. 66 but shows the valve in an open position.
Figure 68:
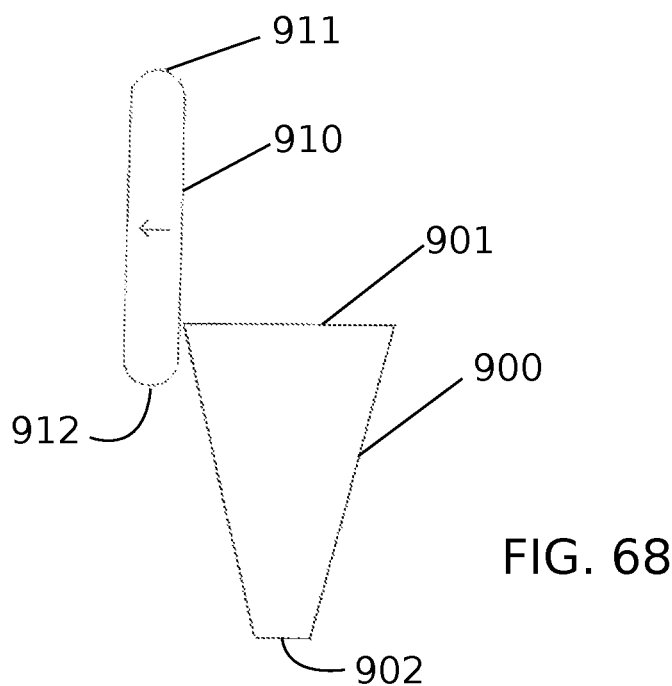
FIG. 68 is similar to FIG. 66 but shows the valve in the closed position after the valve was open.

In operation, the valve assembly opens when the leading edge of the shaft passage 910 begins alignment with the leading edge of the inner guide plate passages 900. The valve assembly closes when the trailing edge of the shaft passage 910 ceases to be aligned with the trailing edge of the inner guide passage 900. Thus, the rotational length of time the valve assembly is open comprises the width of the shaft passage 910 plus the width of the inner guide plate passage 900 at their relative widest aligned portions. Hence, upon comparison of FIGS. 63-65 with FIGS. 66-68, it is seen how the length of time the valve is opened per revolution (the open/closed ratio) can be adjusted by adjusting the location of the shaft up or down relative to the inner guide so that the overlap of respective passages 910 and 900 are adjusted. FIGS. 63-65 show a lesser open/close ratio and FIGS. 66-68 show a larger open/close ratio. In FIGS. 63 and 66, the valve is shown just before opening. In FIGS. 64 and 67, the valve is shown in an open position. In FIGS. 65 and 68, the valve is shown just after closing.

It is appreciated that gas such as steam is just one preferred type of medium that can be used with the present invention. The present invention is also useful with other mediums such as liquid without departing from the broad aspects of the present invention. For example, a suitable liquid medium application could be a liquid injector.

It is appreciated that in an alternative embodiment of the present invention, that the inner and outer plates of the present invention could be replaced with a solid body that is hollowed out or bored in a cylindrical manner to receive the shaft. The bore would have two passages (an inlet passage and an outlet passage) that could be formed in the body passing between the body outside and into the cylindrical portion that are offset 180 degrees. The passages would be aligned with the shaft passage when the valve assembly is open and not aligned with the shaft passage when the valve assembly is closed.

Thus, it is apparent that there has been provided, in accordance with the invention, valve assembly that fully satisfies the objects, aims and advantages as set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A valve assembly comprising:
   an inner guide with an inner guide passage;
   an outer guide with an outer guide passage, said inner guide being separate from said outer guide; and
   a shaft with a shaft passage, said shaft being a linear shaft having a first end and a second end with a shaft longitudinal axis between said first end and said second end, and said shaft passage being a slot having a slot longitudinal axis oriented parallel to said shaft longitudinal axis, said shaft being rotatable relative to said inner guide and said outer guide, said shaft contacting said inner guide and said outer guide, said shaft being selectably linearly shiftable parallel to said shaft longitudinal axis with respect to said inner guide and said outer guide to alter an effective passage size, thereby altering a volume of a high-pressure medium passing through said shaft passage during a revolution of said shaft,
   wherein said valve assembly is open to allow the high-pressure medium to pass though said slot when said inner guide passage and said outer guide passage are aligned with said shaft passage, and said valve assembly is closed when said inner guide passage and said outer guide passage are not aligned with said shaft passage.

2. The valve assembly of claim 1, wherein said valve assembly further comprises a base, said base having an entrance plate with an entrance plate passage, said entrance plate passage being aligned with said inner guide passage.

3. The valve assembly of claim 1, wherein said valve assembly is variable in at least three ways, including:
adjusting RPM of said shaft;
changing a ratio of said valve assembly being open to closed in each revolution; and
changing the effective passage size.

4. The valve assembly of claim 3, wherein said ratio of said valve assembly being open to closed in each revolution is determined by a percent of time said valve assembly is open during each revolution divided by a percent of time said valve assembly is closed.

5. The valve assembly of claim 3 further comprising a drive shaft having a female end, wherein said shaft has a male end that is linearly movable within said female end when said shaft is linearly shifted relative to said inner guide.

6. The valve assembly of claim 3, wherein changing said effective opening size is accomplished by using a gate that selectably covers a portion of said outer guide.

7. The valve assembly of claim 1, wherein:
said inner guide has an inner guide recess;
said outer guide has an outer guide recess;
said shaft is cradled by said inner guide recess and said outer guide recess, wherein a connector with a head holds said shaft in position relative to said inner guide recess and said outer guide recess; and
said valve assembly further comprises a spring, said spring being between said head and said outer guide, said spring biasing said outer guide into engagement with said shaft.

8. The valve assembly of claim 1, wherein:
said inner guide is separated from said outer guide by said shaft; and
said shaft has a perimeter, a portion of said perimeter of said shaft that is between said inner guide and said outer guide is exposed to the high-pressure medium.

9. The valve assembly of claim 1, wherein:
said inner guide has a plurality of linearly aligned inner guide passages;
said shaft has a plurality of linearly aligned shaft passages; and
said plurality of linearly aligned inner guide passages and alignable with said plurality of linearly aligned shaft passages.

10. A valve assembly comprising:
an inner guide and an outer guide;
a shaft being a linear shaft having a first end and a second end, said shaft having a shaft longitudinal axis between said first end and said second end, and said shaft being between said inner guide and said outer guide, said shaft being rotatable and said shaft having a shaft passage through which a high-pressure medium passes when said valve assembly is open, said shaft passage being a slot with a slot longitudinal axis that is parallel to said shaft longitudinal axis, said shaft being selectably linearly shiftable parallel to said shaft longitudinal axis with respect to said inner guide and said outer guide to alter an effective passage size, thereby altering a volume of the high-pressure medium passing through said shaft passage during a revolution of said shaft;
a connector connecting said inner guide and said outer guide, said connector having a head; and
a spring, said spring being between said head and said outer guide, and being operable with said head to bias said outer guide into engagement with said shaft.

11. The valve assembly of claim 10, wherein:
said inner guide has an inner guide passage;
said outer guide has an outer guide passage;
said valve assembly is open when said inner guide passage, said shaft passage and said outer guide passage are aligned; and
said valve assembly is closed when said inner guide passage, said shaft passage and said outer guide passage are not aligned.

12. The valve assembly of claim 11, wherein:
said inner guide has an inner guide recess;
said outer guide has an outer guide recess;
said shaft contacts said inner guide at said inner guide recess and contacts said outer guide at said outer guide recess; and
said shaft has a perimeter, a portion of said perimeter of said shaft that is between said inner guide and said outer guide is exposed to said high-pressure medium.

13. The valve assembly of claim 10, wherein said valve assembly is variable in at least three ways, including:
adjusting RPM of said shaft;
changing a ratio of said valve assembly being open to closed in each revolution; and
changing the effective passage size.

14. A valve assembly for a high-pressure medium, said valve assembly comprising:
an inner guide with an inner guide passage; and
an outer guide with an outer guide passage, said inner guide does not contact said outer guide;
a shaft that is a linear shaft having a first end and a second end, said shaft having a shaft longitudinal axis between said first end and said second end, said shaft being between said inner guide and said outer guide, said shaft having an outer perimeter and a shaft passage that is a slot, said slot having a slot longitudinal axis that is parallel to said shaft longitudinal axis, said shaft being selectably linearly shifted parallel to said shaft longitudinal axis with respect to said inner guide and said outer guide to alter an effective passage size, thereby altering a volume of the high-pressure medium passing through said shaft passage during a revolution of said shaft,
wherein:
said inner guide is separated from said outer guide by said shaft;
a portion of said outer perimeter of said shaft that is between said inner guide and said outer guide is exposed to the high-pressure medium both when said valve assembly is open and closed;
said valve assembly is open when said inner guide passage and said outer guide passage are aligned with said shaft passage to allow the high-pressure medium to pass through said slot.

15. The valve assembly of claim 14, wherein:
said inner guide has an inner guide recess;
said outer guide has an outer guide recess;
said shaft contacts said inner guide at said inner guide recess and contacts said outer guide at said outer guide recess; and
said valve assembly further comprises:
a connector connecting said inner guide and said outer guide, said connector having a head; and
a spring being between said head and said outer guide and being operable with said head to bias said outer guide into engagement with said shaft.

16. The valve assembly of claim 14, wherein said valve assembly is variable in at least three ways, including:

adjusting RPM of said shaft;
changing a ratio of said valve assembly being open to closed in each revolution; and
changing the effective passage size.

17. A valve assembly comprising:
an inner guide with an inner guide passage, said inner guide having an inner guide top and an inner guide bottom;
an outer guide with an outer guide passage;
a shaft with a shaft passage, said shaft having a first end and a second end, said shaft having a shaft longitudinal axis between said first end and said second end, said shaft being a linear shaft and said shaft passage being a slot, said slot having a slot longitudinal axis that is parallel to said shaft longitudinal axis, said shaft separating said inner guide and said outer guide, and being rotatable relative to said inner guide and said outer guide at a selected RPM,
wherein said valve assembly is open when said inner guide passage and said outer guide passage are aligned with said shaft passage allowing a high-pressure medium to pass through said slot, and said valve assembly is closed when said inner guide passage and said outer guide passage are not aligned with said shaft passage as said shaft blocks access between said inner guide passage and said outer guide passage,
wherein said valve assembly is variable in at least three ways, including:
adjusting said selected RPM of said shaft;
changing a ratio of said valve assembly being open to closed in each revolution as determined by a percent of time said valve assembly is open during each revolution divided by a percent of time said valve assembly is closed; and
changing an effective opening size by linearly shifting said shaft parallel to said shaft longitudinal axis relative to said inner guide and said outer guide thereby altering a volume of the high-pressure medium passing through said shaft passage during a revolution of said shaft.

18. A valve assembly comprising:
an inner guide with an inner guide passage;
an outer guide with an outer guide passage, said inner guide being separate from said outer guide; and
a shaft with a shaft passage, said shaft being a linear shaft and said shaft passage being a slot, said shaft being rotatable relative to said inner guide and said outer guide, said shaft contacting said inner guide and said outer guide,
wherein said valve assembly is open to allow a high-pressure medium to pass though said slot when said inner guide passage and said outer guide passage are aligned with said shaft passage, and said valve assembly is closed when said inner guide passage and said outer guide passage are not aligned with said shaft passage,
wherein:
said inner guide has an inner guide recess;
said outer guide has an outer guide recess;
said shaft is cradled by said inner guide recess and said outer guide recess, wherein a connector with a head holds said shaft in position relative to said inner guide recess and said outer guide recess; and
said valve assembly further comprises a spring, said spring being between said head and said outer guide, said spring biasing said outer guide into engagement with said shaft.

19. A valve assembly for a high-pressure medium, said valve assembly comprising:
an inner guide with an inner guide passage; and
an outer guide with an outer guide passage, said inner guide does not contact said outer guide;
a shaft that is a linear shaft being between said inner guide and said outer guide, said shaft having an outer perimeter and a shaft passage that is a slot,
wherein:
said inner guide is separated from said outer guide by said shaft;
a portion of said outer perimeter of said shaft that is between said inner guide and said outer guide is exposed to the high-pressure medium both when said valve assembly is open and closed;
said valve assembly is open when said inner guide passage and said outer guide passage are aligned with said shaft passage to allow the high-pressure medium to pass through said slot,
wherein:
said inner guide has an inner guide recess;
said outer guide has an outer guide recess;
said shaft contacts said inner guide at said inner guide recess and contacts said outer guide at said outer guide recess; and
said valve assembly further comprises:
a connector connecting said inner guide and said outer guide, said connector having a head; and
a spring being between said head and said outer guide and being operable with said head to bias said outer guide into engagement with said shaft.

* * * * *